US012336941B2

(12) United States Patent
Zerhusen et al.

(10) Patent No.: US 12,336,941 B2
(45) Date of Patent: Jun. 24, 2025

(54) PATIENT SUPPORT APPARATUS HAVING DETACHABLE BARRIER ASSEMBLY

(71) Applicant: Hill-Rom Services, Inc., Batesville, IN (US)

(72) Inventors: Robert M. Zerhusen, Batesville, IN (US); Archana Vaidyanathan, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 18/296,585

(22) Filed: Apr. 6, 2023

(65) Prior Publication Data

US 2023/0248593 A1 Aug. 10, 2023

Related U.S. Application Data

(63) Continuation of application No. 16/413,830, filed on May 16, 2019, now Pat. No. 11,628,102.

(60) Provisional application No. 62/674,369, filed on May 21, 2018.

(51) Int. Cl.

| | |
|---|---|
| ***A61G 5/00*** | (2006.01) |
| ***A61G 5/04*** | (2013.01) |
| ***A61G 7/015*** | (2006.01) |
| ***A61G 7/018*** | (2006.01) |
| ***A61G 7/05*** | (2006.01) |
| ***A61G 7/08*** | (2006.01) |

(52) U.S. Cl.

CPC ............. *A61G 5/006* (2013.01); *A61G 5/043* (2013.01); *A61G 7/015* (2013.01); *A61G 7/018* (2013.01); *A61G 7/0525* (2013.01); *A61G 7/0528* (2016.11); *A61G 7/08* (2013.01); *A61G 2203/16* (2013.01)

(58) Field of Classification Search

CPC ........ A61G 5/006; A61G 5/043; A61G 7/015; A61G 7/018; A61G 7/0525; A61G 7/0528; A61G 7/08; A61G 2203/16; A61G 5/1089; A61G 7/0509; A61G 7/0514; A61G 7/0518; A61G 2203/12; A61G 2203/32; A61G 2203/34; A61G 2203/38; A61G 5/101; A61G 5/1032; A61G 5/1037; A61G 5/1059; A61G 5/1067; A61G 5/1075; A61G 7/005; A61G 7/0506; A61G 7/053; F16B 21/06

USPC .............................................................. 5/611

See application file for complete search history.

(56) References Cited

U.S. PATENT DOCUMENTS

| | | | |
|---|---|---|---|
| 3,380,546 | A | 4/1968 | Rabjohn |
| 3,544,127 | A | 12/1970 | Dobson |
| 3,848,883 | A | 11/1974 | Breacain |
| 4,221,273 | A | 9/1980 | Finden |

(Continued)

FOREIGN PATENT DOCUMENTS

| | | | |
|---|---|---|---|
| CN | 102805691 | A | 12/2012 |
| EP | 2883523 | A1 | 6/2015 |
| WO | 910585 | A1 | 7/1991 |

*Primary Examiner* — Justin C Mikowski
*Assistant Examiner* — Luke Hall
(74) *Attorney, Agent, or Firm* — Barnes & Thornburg LLP

(57) ABSTRACT

A patient support apparatus that is adaptable to multiple modes of transport includes a variable length base and a drive system that includes two independently drivable wheels that are responsive to inputs from a user to steer the patient support apparatus. A barrier assembly is secured to the upper frame by a tab which is received into a receiver formed in a head end of the frame.

20 Claims, 22 Drawing Sheets

(56) References Cited

U.S. PATENT DOCUMENTS

| | | | |
|---|---|---|---|
| 4,422,515 A | 12/1983 | Loveless | |
| 4,613,151 A | 9/1986 | Kielczewski | |
| 5,083,625 A | 1/1992 | Bleicher | |
| 5,279,010 A | 1/1994 | Neder et al. | |
| 5,366,036 A | 11/1994 | Perry | |
| 5,933,884 A | 8/1999 | Shikinami et al. | |
| 6,154,690 A | 11/2000 | Coleman | |
| 6,321,878 B1 | 11/2001 | Mobley et al. | |
| 6,330,926 B1 | 12/2001 | Heimbrock et al. | |
| 6,398,409 B1 | 6/2002 | Brooks | |
| 6,421,854 B1 | 7/2002 | Heimbrock | |
| 6,505,359 B2 | 1/2003 | Heimbrock et al. | |
| 6,574,813 B2 | 6/2003 | Bolden et al. | |
| 6,598,247 B1 | 7/2003 | Heimbrock et al. | |
| 6,611,979 B2 | 9/2003 | Welling et al. | |
| 6,739,006 B2 | 5/2004 | Borders et al. | |
| 6,752,224 B2 | 6/2004 | Hopper et al. | |
| 6,865,775 B2 | 3/2005 | Ganance | |
| 6,874,800 B2 | 4/2005 | George | |
| 6,983,501 B2 | 1/2006 | Heimbrock et al. | |
| 7,010,369 B2 | 3/2006 | Borders et al. | |
| 7,017,208 B2 | 3/2006 | Weismiller et al. | |
| 7,073,220 B2 | 7/2006 | Simmonds et al. | |
| 7,090,042 B2 | 8/2006 | Coveyou et al. | |
| 7,302,717 B2 | 12/2007 | Reinke et al. | |
| 7,537,069 B2 | 5/2009 | Kramer et al. | |
| 7,644,457 B2 | 1/2010 | Hensley et al. | |
| 7,834,768 B2 | 11/2010 | Dixon et al. | |
| 7,886,380 B2 | 2/2011 | Hornbach et al. | |
| 7,922,183 B2 | 4/2011 | Figel et al. | |
| 7,934,276 B2 | 5/2011 | Newkirk et al. | |
| 7,953,537 B2 | 5/2011 | Bhai | |
| 8,176,584 B2 | 5/2012 | Hornbach et al. | |
| 8,260,517 B2 | 9/2012 | Bhai | |
| 8,266,742 B2 | 9/2012 | Andrienko | |
| 8,296,884 B2 * | 10/2012 | Heimbrock .......... | A61G 7/0509 5/430 |
| 8,341,779 B2 | 1/2013 | Hornbach et al. | |
| 8,353,071 B2 * | 1/2013 | Turner ..................... | A61G 7/16 5/613 |
| 8,387,184 B2 | 3/2013 | Turner et al. | |
| 8,437,876 B2 | 5/2013 | Receveur et al. | |
| 8,442,738 B2 | 5/2013 | Patmore | |
| 8,607,378 B2 | 12/2013 | Moriarity et al. | |
| 8,607,388 B1 | 12/2013 | Flanagan et al. | |
| 8,646,131 B2 * | 2/2014 | Heimbrock ............ | A47C 21/08 5/430 |
| 8,752,220 B2 * | 6/2014 | Soderberg ............ | A61G 7/0524 5/426 |
| 8,757,308 B2 | 6/2014 | Bhai et al. | |
| 8,844,073 B2 | 9/2014 | Riley et al. | |
| 8,973,187 B2 | 3/2015 | Hornbach | |
| 9,132,051 B2 | 9/2015 | Heil | |
| 9,707,143 B2 | 7/2017 | Thodupunuri et al. | |
| 10,603,234 B2 | 3/2020 | Puvogel et al. | |
| 2004/0124017 A1 | 7/2004 | Jones et al. | |
| 2004/0159473 A1 | 8/2004 | Ruschke et al. | |
| 2005/0210579 A1 | 9/2005 | Moffa et al. | |
| 2007/0182220 A1 | 8/2007 | Walkinshaw et al. | |
| 2009/0233769 A1 | 9/2009 | Pryor | |
| 2012/0023666 A1 | 2/2012 | Heimbrock et al. | |
| 2012/0068435 A1 | 3/2012 | Birmanns et al. | |
| 2012/0102655 A1 * | 5/2012 | Zerhusen ................. | A61G 7/16 5/662 |
| 2012/0246830 A1 * | 10/2012 | Hornbach .............. | A61G 7/015 5/81.1 R |
| 2013/0061392 A1 * | 3/2013 | Zerhusen ............. | A61G 7/1074 5/81.1 R |
| 2014/0077581 A1 | 3/2014 | Kanno et al. | |
| 2016/0121956 A1 | 5/2016 | Mizuno | |
| 2016/0193095 A1 * | 7/2016 | Roussy ................ | A61G 7/0509 5/616 |
| 2016/0302986 A1 | 10/2016 | Haladova et al. | |
| 2019/0298590 A1 | 10/2019 | Patmore et al. | |
| 2019/0350780 A1 | 11/2019 | Zerhusen et al. | |

* cited by examiner

PATIENT SUPPORT APPARATUS HAVING DETACHABLE BARRIER ASSEMBLY

CROSS-REFERENCE TO RELATED APPLICATIONS

This application is a continuation of U.S. application Ser. No. 16/413,830, filed May 16, 2019, soon to be U.S. Pat. No. 11,628,102, which claims priority to U.S. Provisional Patent Application Ser. No. 62/674,369, filed May 21, 2018, each of which is herein incorporated by reference in its entirety.

TECHNICAL FIELD

The present disclosure is related to patient support apparatuses that are used for procedures and are operable to transport a patient from one location in a healthcare facility to a second location in the healthcare facility. More specifically, the present application is related to a patient support apparatus that is operable as both a procedural stretcher and a wheelchair.

BACKGROUND

In the modern healthcare facility, patients are often kept for extended periods in the emergency unit or an observation ward while test are run and the patient is under observation. Due to cost constraints, patients are not administratively admitted until it is determined that their acuity level qualifies for reimbursement for treatment as an in-patient. As such, the patient may spend an extended period in a space that is not a typical hospital room. From this location, the patient may be transported to other portions of the facility for diagnostic testing.

In some instances, the patient may be in significant discomfort, lack mobility, or be otherwise incapacitated. As such, there may be a need to move the patient to other areas in the facility without transferring the patient to another patient support apparatus or transport device. In other cases, the patient may be relatively mobile and independent. However, limiting the use of different patient support/transport devices reduces labor in cleaning the equipment between patients. In addition, there may be clinical advantages to the patient using a patient support apparatus as a transport, such as to promote the patient's independence. As such, there is a need for a patient support apparatus that is adaptable to multiple modes of transport to fill the various roles the transport equipment may fulfill in the patient intake process.

SUMMARY

The present disclosure includes one or more of the features recited in the appended claims and/or the following features which, alone or in any combination, may comprise patentable subject matter.

According to a first aspect of the present disclosure, a patient support apparatus comprise a base having a variable length, a pair of telescopic lifts extending upwardly from the base, an upper frame supported on the telescopic lifts, the upper frame movable between a chair configuration and a bed configuration, and a pair of independent drive wheels positioned on lateral sides of the base. Each of the drive wheels receives an independent input from a user supported on the patient support apparatus and responsive to the independent input to drive each to move and control the direction of movement of the patient support apparatus over a floor supporting the patient support apparatus.

In some embodiments, the patient support apparatus further comprises a removable barrier assembly coupled to a foot end of the upper frame.

In some embodiments, the patient support apparatus further comprises a removable barrier assembly coupled to a head end of the upper frame.

In some embodiments, a removable barrier assembly comprises a fixed panel and a first movable panel pivotably coupled to the fixed panel providing a barrier at an end of the patient support apparatus, the movable panel movable between a barrier position providing a barrier along a portion of a lateral side of the patient support apparatus and an out of the way position.

In some embodiments, the removable barrier assembly further comprises a second movable panel pivotably coupled to the fixed panel on a side opposite the first movable panel, the second movable panel movable between a barrier positon providing a barrier along a portion of the other lateral side of the patient support apparatus and an out of the way position.

In some embodiments, the first and second movable panels nest in their respective out of the way positions.

In some embodiments, a movable panel is pivotable about an axis that is obtuse to the respective barrier surfaces of the end panel and the movable panel.

In some embodiments, the base comprises at least a first extension that is movable relative to a main portion to extend the length of the base.

In some embodiments, the first extension is driven by a powered actuator to move the extension relative to the main portion.

In some embodiments, the base further comprises a second extension that is positioned on a side of the main portion of the base opposite the first extension, the second extension movable relative to the main portion to further extend the length of the base.

In some embodiments, the actuator is operable to simultaneously move both the first and second extensions to extend or retract the length of the base in unison.

In some embodiments, the extensions include casters that engage the floor.

In some embodiments, the casters of each of the extensions and the drive wheels may all engage the floor simultaneously.

In some embodiments, the base includes a pair of actuators that cooperate to extend and retract the first and second extensions.

In some embodiments, at least one of the extensions includes a brake operable to lock the casters of the respective extension to prevent the patient support apparatus from moving over the floor.

In some embodiments, the base includes a foot pedal that is actuable to cause the independent drive wheels to lock or unlock.

In some embodiments, each drive wheel has a respective user input accessible to a user and associated with the drive wheel, the respective drive wheel responsive to the force applied to the user input associated with the drive wheel.

In some embodiments, each of the drive wheels is driven by a respective motor.

In some embodiments, the force applied by a user to a respective user input is multiplied by the motor to provide a drive signal that is larger than the input signal.

In some embodiments, each time a user actuates a respective user input the user input signal is applied to the respective drive wheel for an equivalent pulse and the drive wheel speed decays to mimic the action of a wheelchair.

In some embodiments, the user input will receive a signal in either a forward or rear direction and the drive signal of the motor will respond to the direction of the user input to control the speed and direction of the respective drive wheel such that an occupant may use variations in inputs to steer the patient support apparatus.

According to a second aspect of the present disclosure, a patient support apparatus is movable between a bed configuration and a chair configuration, the patient support apparatus having an upper frame and a lift system for moving the upper frame vertically. The patient support apparatus comprises a base having a main portion supporting the lift system and a pair of extensions that are movable between an extended position when the patient support apparatus is in the bed configuration and a retracted position when the patient support apparatus is in the chair configuration, each of the pair of extensions extending from opposite longitudinal sides of the main portion, the extensions moving in unison to vary the length of the base based on the position of components of the upper frame.

In some embodiments, the extensions move in proportion to one another.

In some embodiments, the movement of a first one of the pair of extensions relative to the main portion is transferred directly to the second one of the pair of extensions to cause the extensions to move in proportion to one another.

In some embodiments, movement of a first one of the pair of extensions is caused by a drive that is interposed between the main portion and the first one of the pair of extensions, the drive extending and retracting to change the position of the extension relative to the main portion.

In some embodiments, a transmission transfers the movement of the first one of the pair of extensions to the second one of the pair of extensions so that the movement of the drive is transferred through the transmission to the second one of the pair of extensions.

In some embodiments, the transmission is interposed between the first one and the second one of the pair of extensions.

In some embodiments, the transmission comprises a drive rack coupled to the first one of the pair of extensions, a follower rack coupled to the second one of the pair of extensions, and wherein a pinion is interposed between the drive rack and the follower rack to transfer motion of the drive rack to the follower rack to thereby move the second one of the pair of extensions in unison with the first one of the pair of extensions.

In some embodiments, the patient support apparatus further comprises a controller operable to receive position information from drives that control the configuration of the upper frame, and wherein the signals from the position information of the drives that control the configuration of the upper frame are processed by the controller to determine the amount of extension necessary to stabilize the patient support apparatus, the controller causing the pair of extensions to move based on the position information of the drives that control the configuration of the upper frame to stabilize the patient support apparatus.

In some embodiments, the controller is further operable to cause movement of the extensions to prevent interference with components of the upper frame, the decision to move the extensions being dependent on the position of one or more members of the upper frame.

In some embodiments, the extensions are fully extended when the patient support apparatus is in the bed configuration and fully retracted when the patient support apparatus is in the chair configuration.

According to a third aspect of the present disclosure, the patient support apparatus comprises a drive system including at least two inputs accessible by a user when the patient support apparatus is in the chair configuration, the user inputs providing a signal to the drive system to control the speed and direction of the patient support apparatus over a floor supporting the patient support apparatus based on the composite signal of the at least two inputs.

In some embodiments, the at least two inputs each include a force sensor operable to detect both a direction and magnitude of a force applied to the respective user input.

In some embodiments, the drive system includes at least two drive wheels, the drive wheels responsive to the resultant input of the at least two user inputs.

In some embodiments, the two user inputs are operable to cause the patient support apparatus to move forward, make a forward turn, move in reverse, and make a reverse turn.

In some embodiments, the user inputs are each fixed relative to a respective drive wheel.

In some embodiments, the user inputs are each movable with a respective drive wheel.

In some embodiments, the patient support apparatus further comprises a controller which is operable to multiply the user input force to cause the wheels to be driven at a rate that offsets the weight of the patient support apparatus.

In some embodiments, the drive system includes a separate drive motor operable to drive respective drive wheel in either a forward or reverse direction.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which:

FIG. 10 showing the engagement of the head end barrier assembly with a portion of the upper frame of the patient support apparatus;

DETAILED DESCRIPTION

Figure 1:
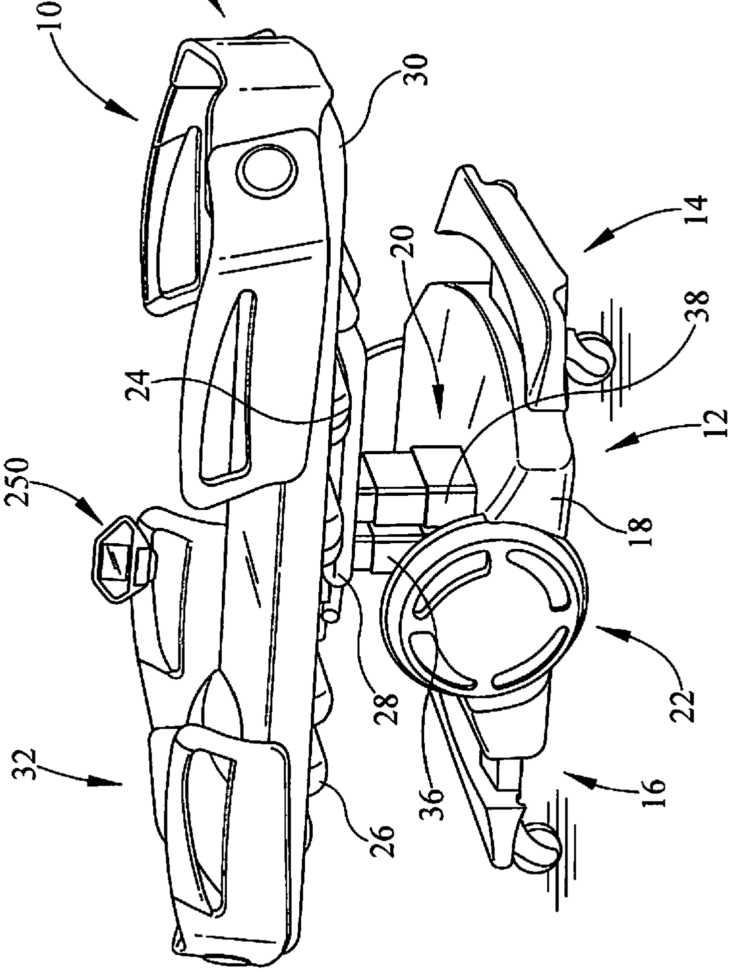
FIG. 1 is a perspective view of a patient support apparatus according to the present disclosure, the patient support apparatus being shown in a bed configuration with the head end of the being positioned on the left side of FIG. 1.
Figure 2:
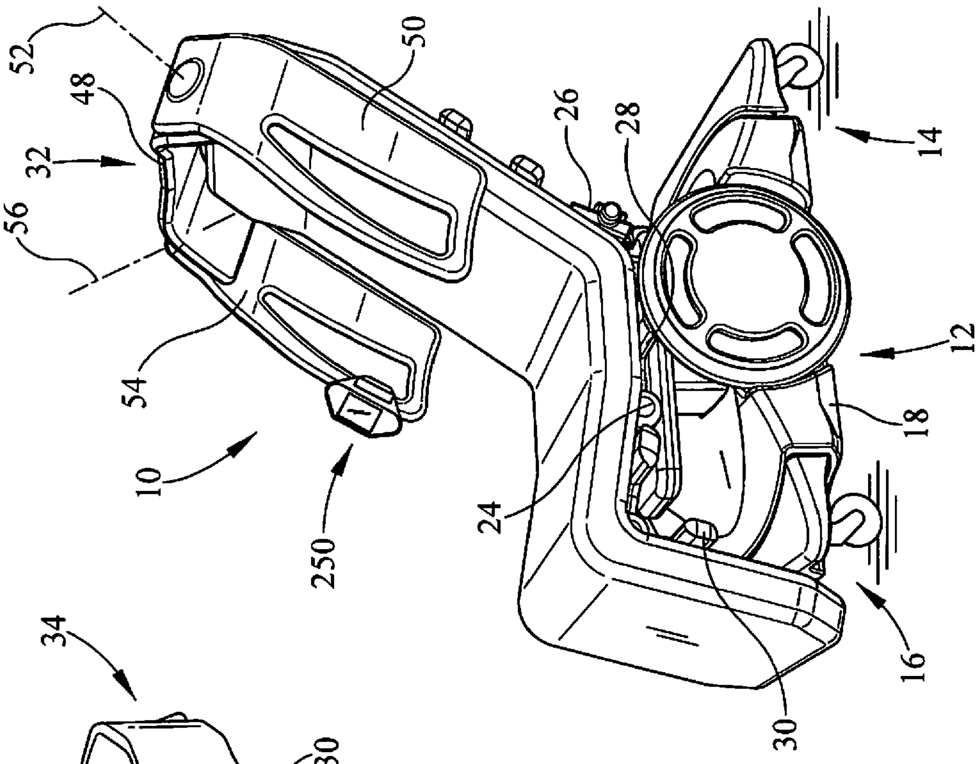
FIG. 2 is a perspective view of a patient support apparatus similar to the patient support apparatus shown in FIG. 1, the patient support apparatus of FIG. 2 being shown in a chair configuration with the head end being positioned on the left side of FIG. 2 and with a foot end barrier assembly removed.
Figure 3:
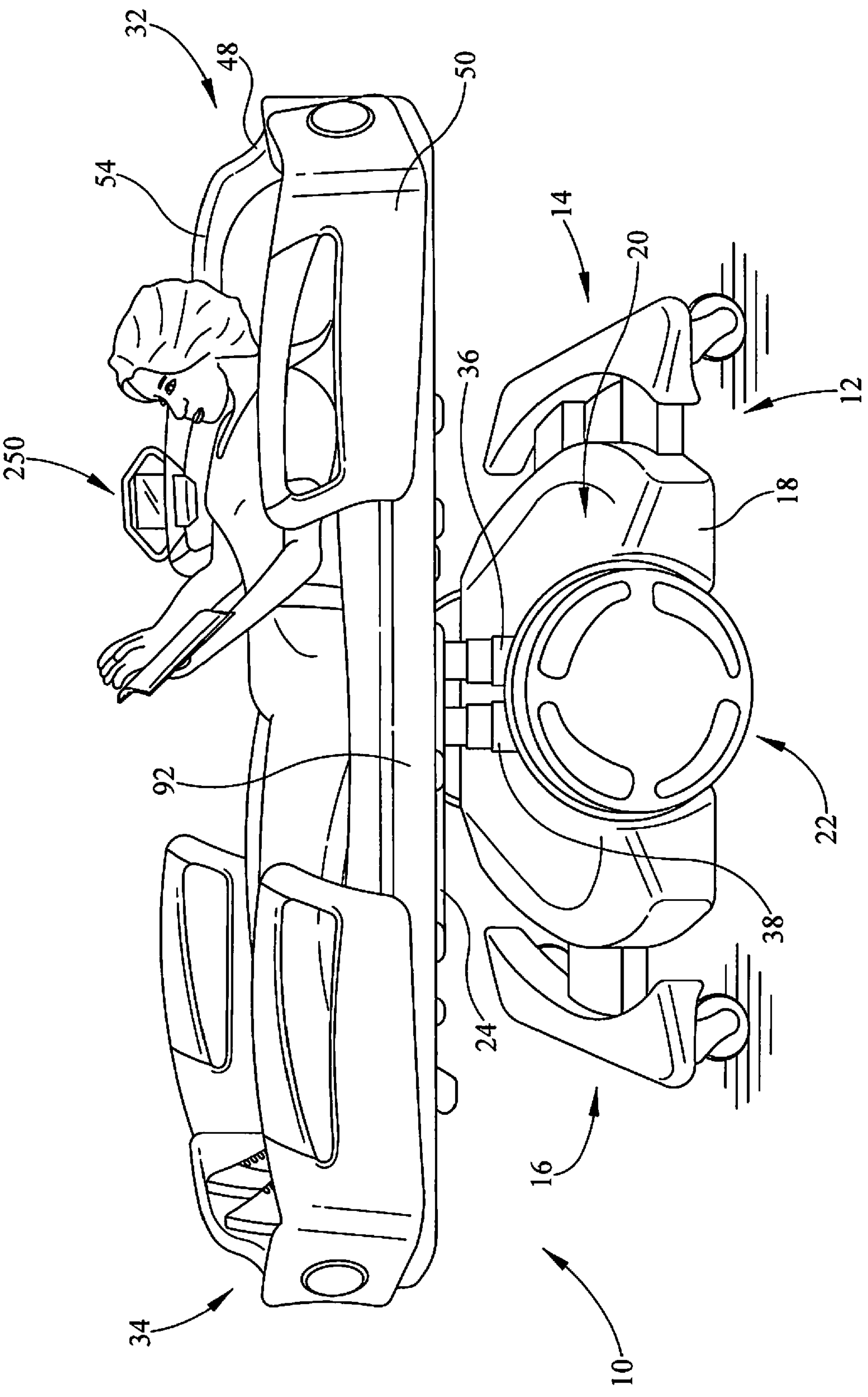
FIG. 3 is a perspective view of the patient support apparatus of FIG. 2 in a bed configuration, the foot end barrier assembly present, and a patient supported on a mattress of the patient support apparatus.
Figure 5:
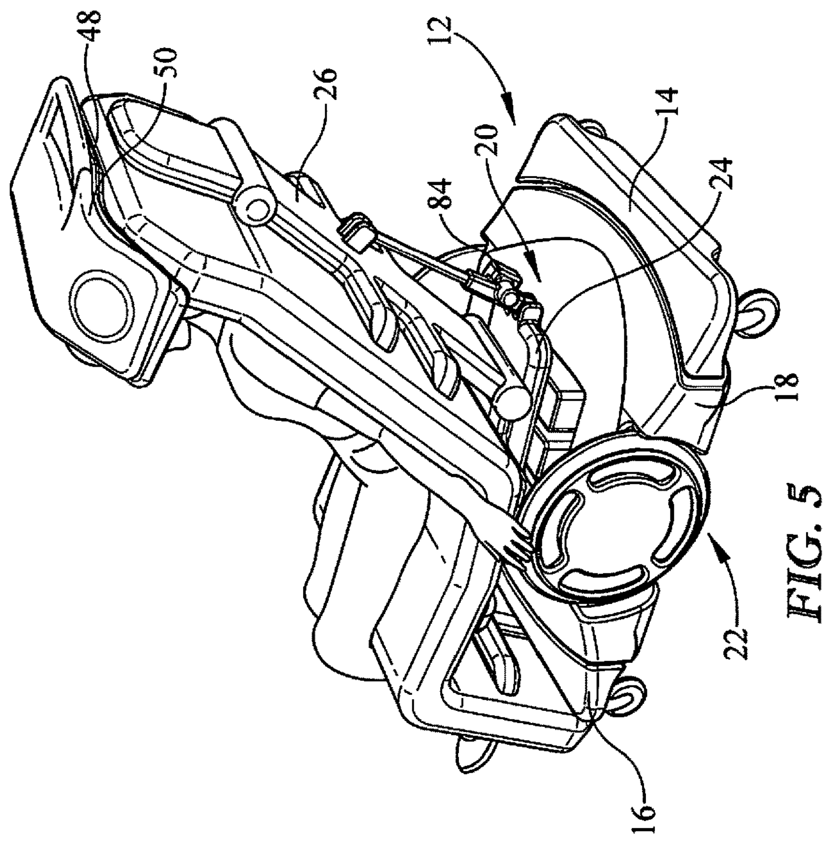
FIG. 5 is a perspective view of the patient support apparatus of FIG. 4, from a different perspective than the view of FIG. 4, FIG. 5 showing the back of a head end of an upper frame of the patient support apparatus.

The present disclosure includes a patient support apparatus 10 that is convertible between a bed configuration shown in FIG. 1 and a chair/wheelchair configuration shown in FIG. 2. The patient support apparatus 10 includes a base 12 that is expandable so that a first extension 14 and a second extension 16 may be extended from a central portion 18 of the base 12 to improve the stability of the patient support apparatus 10 in the bed configuration. The extensions 14 and 16 are retractable as shown in FIG. 2 to provide clearance for a foot section 30 when the patient support apparatus 10 is moved to the chair configuration. The central portion 18 of the base 12 supports a lift system 20 and a drive system 22, each of which will be discussed in further detail below. The upper frame 24 of the patient support apparatus 10 includes a head section 26, a seat section 28, and the foot section 30. The head section 26 and the foot section 30 are pivotable relative to the seat section 28, as will be discussed in further below. The patient support apparatus 10 also includes a head end barrier assembly 32 and a foot end barrier assembly 34. The barrier assemblies 32 and 34 are each removable.

Figure 19:
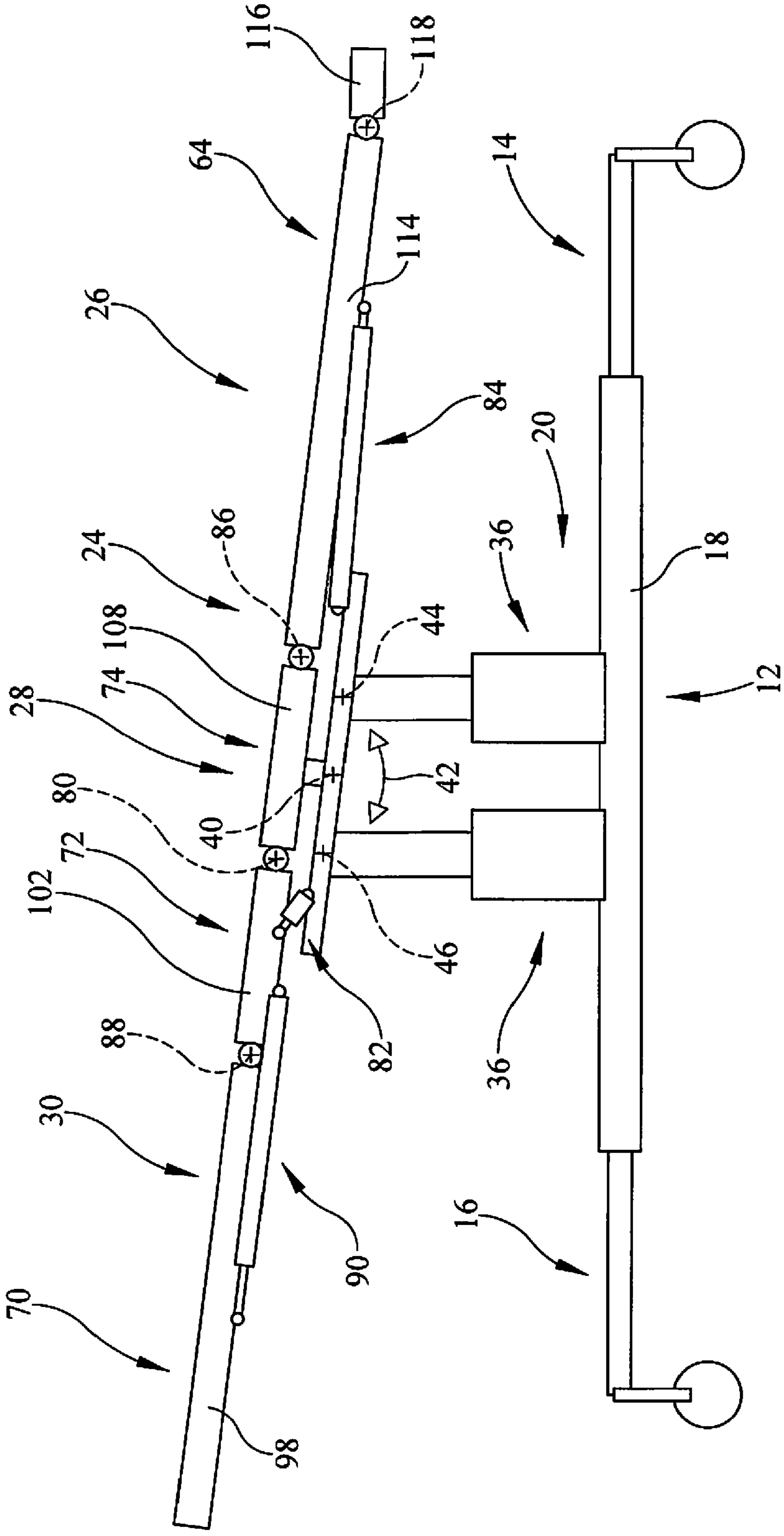
FIG. 19 is a diagrammatic view similar to FIG. 18, FIG. 19 showing the patient support apparatus in a bed configuration, the bed in a tilt condition.

Referring to FIG. 19, the lift system 20 includes lifts embodied as a telescopic head end column 36 and a telescopic foot end column 38, each of which is independently extendable so that the upper frame 24 may be tilted about a lateral horizontal axis 40 as indicated by arrow 42. The lifts 36 and 38 are each fixed to the central portion 18 of the base 12 and pivotably coupled to the upper frame 24 at separate locations so that extension or retraction of either one of the lifts 36 or 38 causes pivoting about the respective pivot axes 44 or 46 at the pivotable connections between the lifts 36 and 38 to cause tilting of the upper frame 24. In use, the lifts 36 and 38 will generally cooperate to move in opposite directions to cause any desired tilting of the upper frame 24. The telescopic column lifts 36 and 38 may be embodied similar to the hi-lo lift units of the CareAssist® ES Medical Surgical bed from Hill-Rom, Inc. of Batesville, Indiana.

Figure 4:
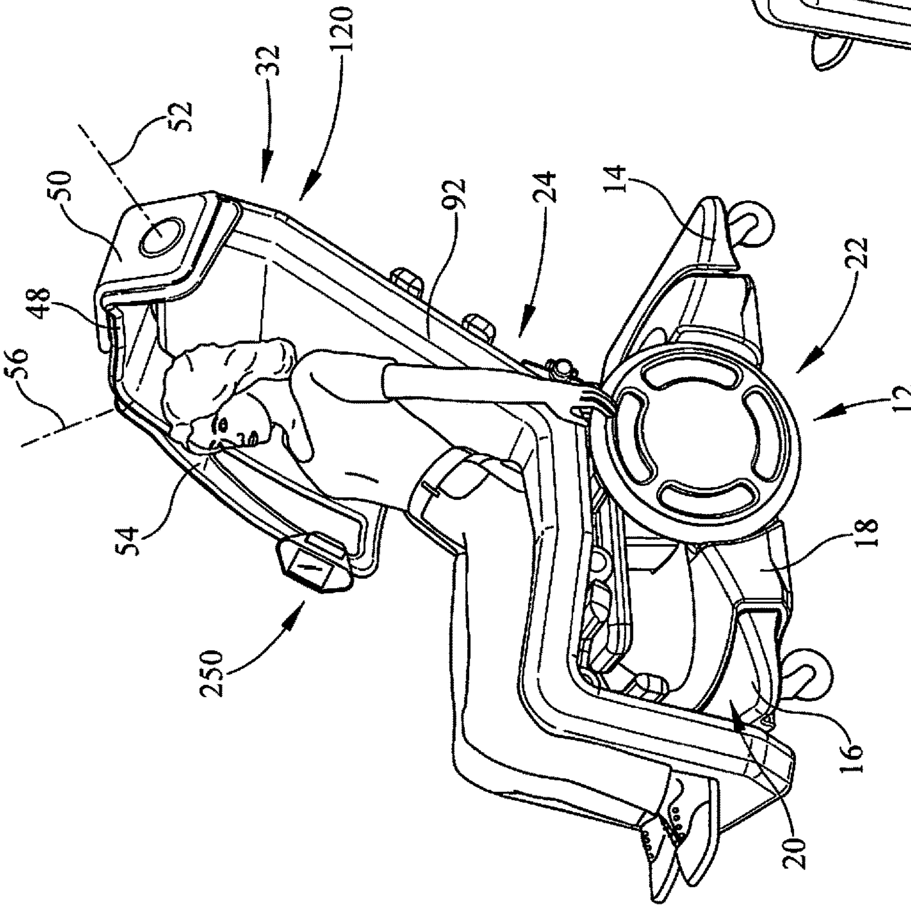
FIG. 4 is a perspective view of the patient support apparatus of FIG. 2 with a patient positioned on the patient support apparatus and with a left head end barrier moved to an out of the way position.
Figure 6:
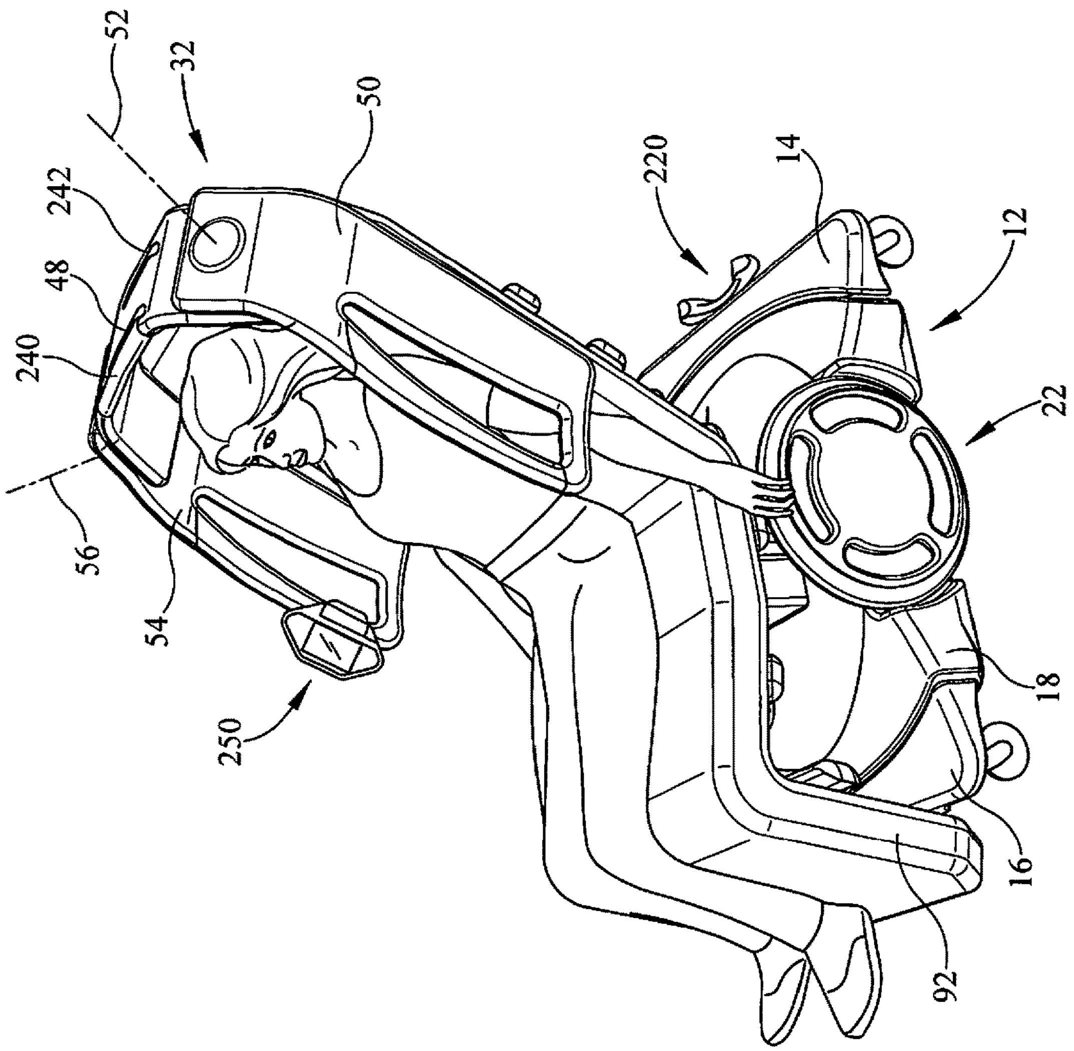
FIG. 6 is a perspective view of the patient support apparatus of FIG. 4 with the head end barrier in the barrier position.
Figure 7:
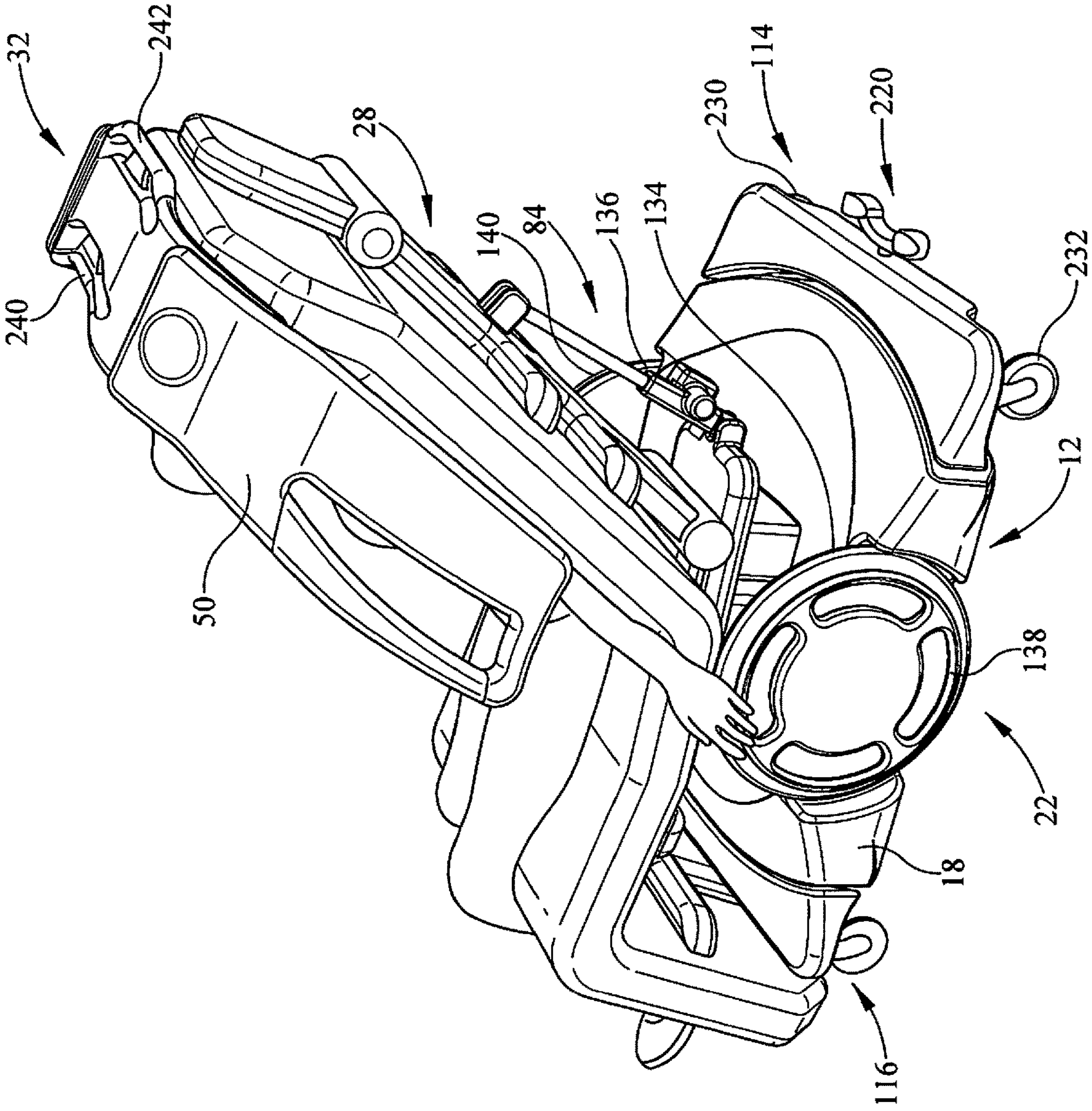
FIG. 7 is a perspective view of the patient support apparatus similar to FIG. 5 with the head end barrier in the barrier position.

When present, the head end barrier assembly 32 includes a head end panel 48 that is fixed to the head section 26. A left hand head panel 50 is pivotably coupled to the head end panel 48 and pivotable about an axis 52 to move between the deployed position shown in FIG. 2 and a retracted position shown in FIG. 4. Referring to FIG. 2, a right hand head panel 54 is pivotably coupled to the panel 48 and pivotable about an axis 56 to a retracted position similar to the retracted position of panel 50 in FIG. 4. The axes 52 and 56 are offset so that there is no interference between panels 50 and 54 when they are both in their respective retracted positions, but allow the panels 50 and 54 to offset with the panel 50 being positioned outboard of the panel 54.

Figure 10:
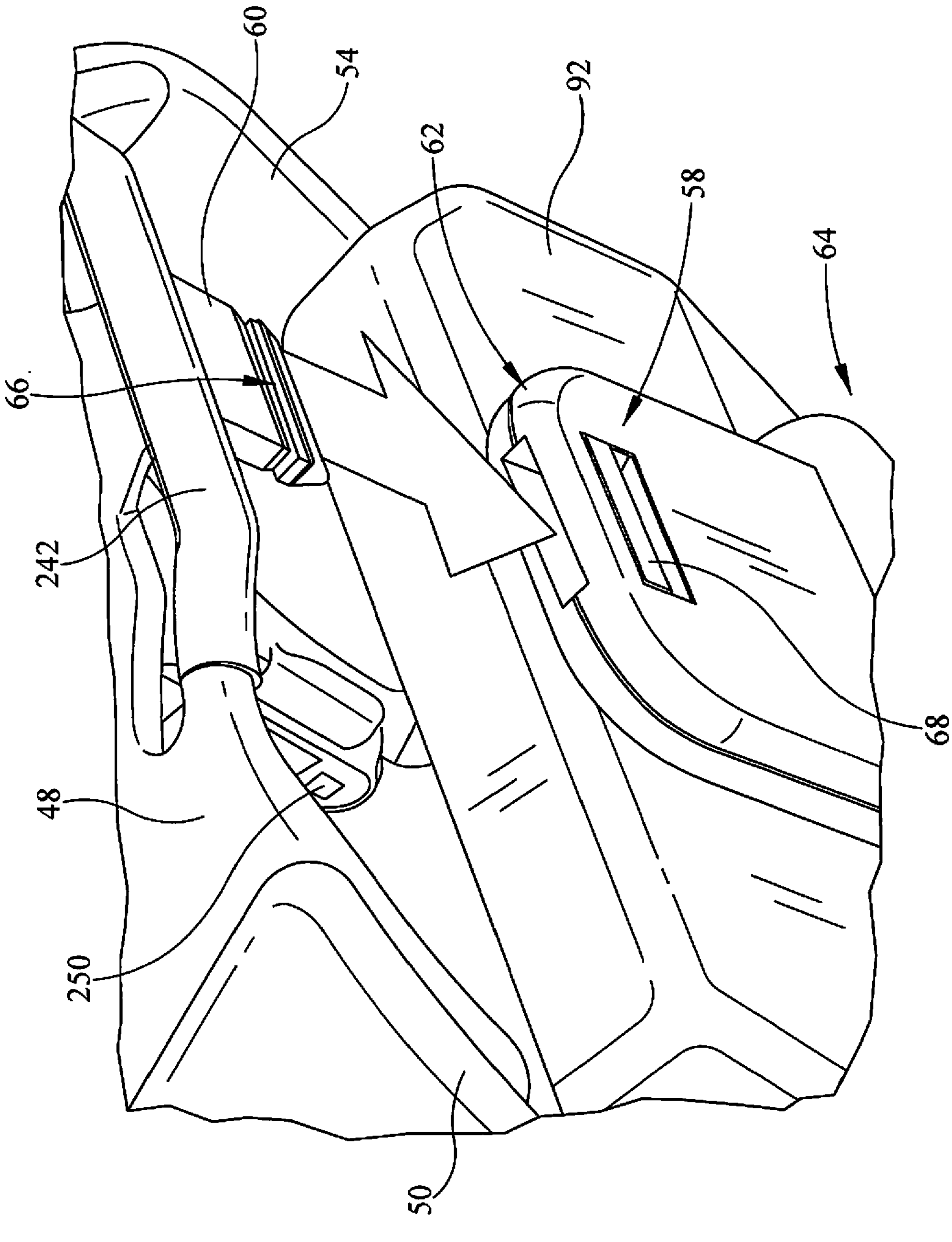
FIG. 10 is a perspective view of a portion of the patient support apparatus of FIG. 2.
Figure 21:
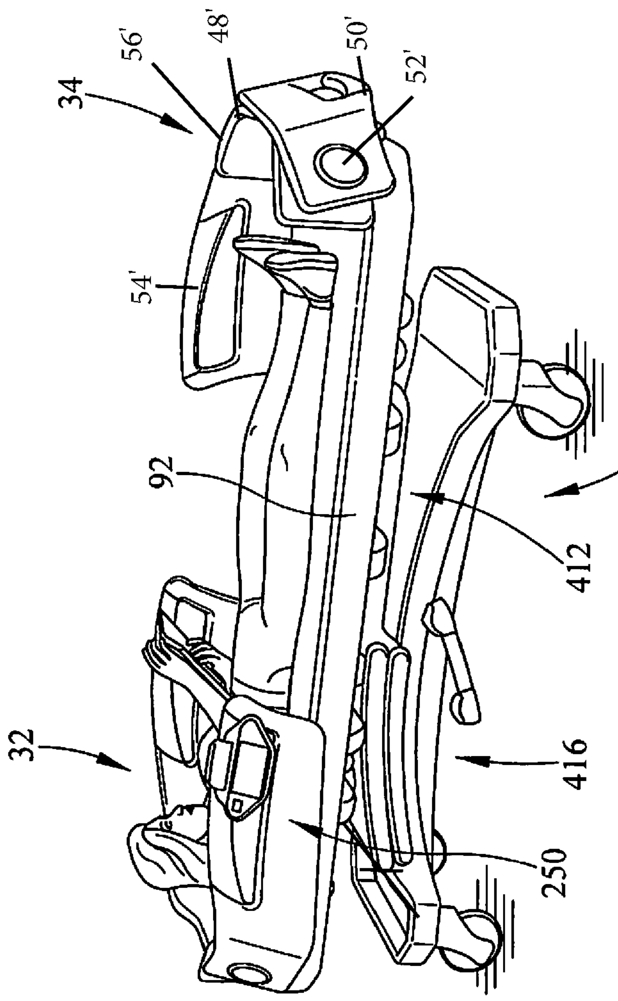
FIG. 21 is a perspective view of the embodiment of patient support apparatus of FIG. 20, the patient support apparatus shown in a bed configuration in FIG. 21.

Referring to FIG. 10, the head end barrier assembly 32 is secured to the upper frame 24 by a tab 60 which is received into a receiver 62 formed in a head end arm 64 of the upper frame 24. The tab 60 is formed to include a channel 66 which is engaged by a spring-loaded grip 58 which has a pawl (not shown) that is positioned in the channel 66 when the tab 60 is positioned in the receiver 62. The pawl of the grip 58 prevents the head end barrier assembly 32 from being removed unless a handle 68 is actuated, which disengages the pawl and allows the tab 60 to be removed from the head end arm 64 such that the entire head end barrier assembly 32 can be removed from the patient support apparatus 10. Foot end barrier assembly 34 is removably coupled to a foot end arm 70 (seen in FIG. 11) in a manner similar to the way in which head end barrier assembly 32 is secured to the head end arm 64. As shown in FIG. 21, the panels 50' and 54' of the foot end barrier assembly 34 are pivotably coupled to the foot end panel 48' and pivotable about an axis 52' and 56'.

Figure 11:
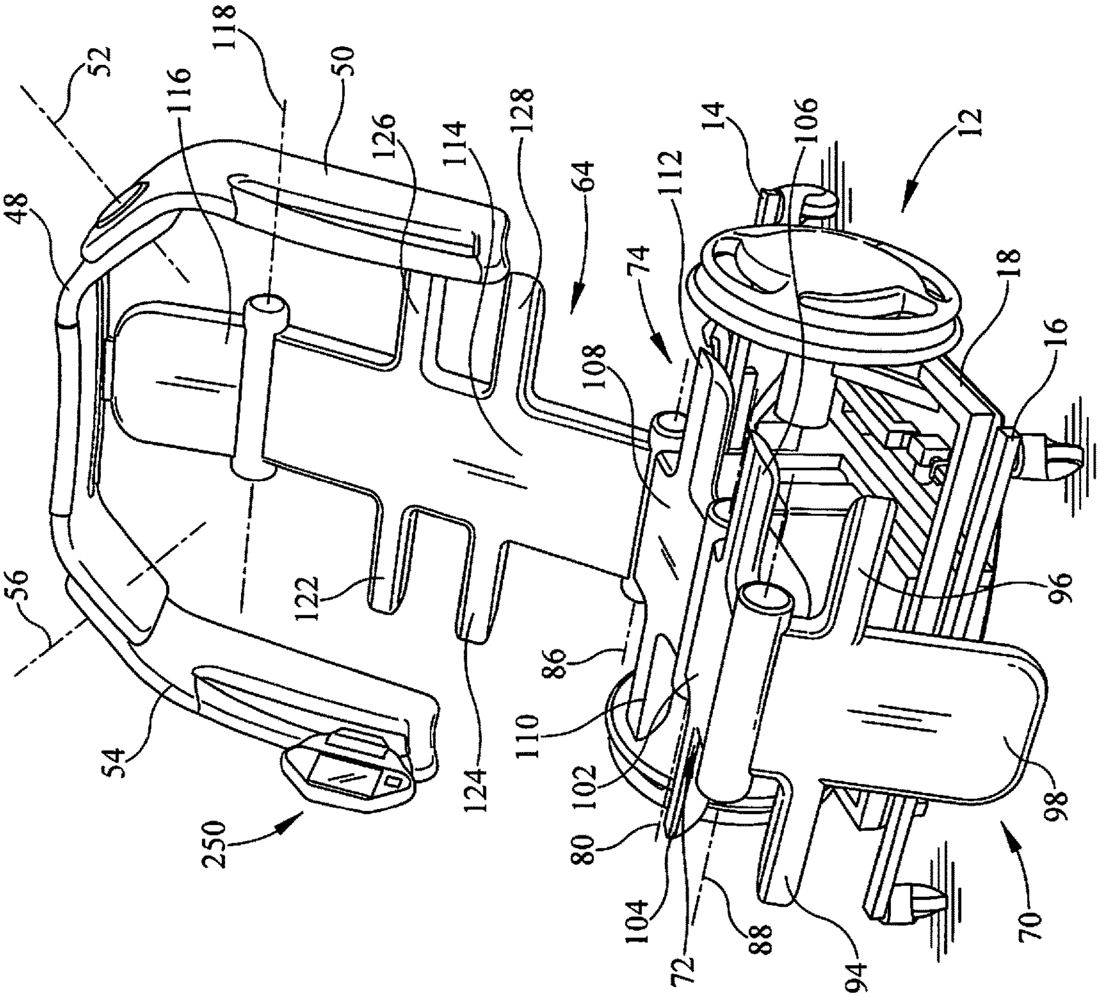
FIG. 11 is a perspective view of the patient support apparatus of FIG. 9 with the portions removed, the patient support apparatus being viewed from the patient's left foot.

With further reference to FIG. 11, the upper frame 24 includes the head end arm 64, the foot end arm 70, a thigh portion 72 and a seat portion 74. The seat portion 74 is pivotably coupled to the telescopic head end column 36 and a telescopic foot end column 38 and the movement of the telescopic head end column 36 and a telescopic foot end column 38 control the overall tilt of the head end arm 64, the foot end arm 70, the thigh portion 72 and the seat portion 74. The thigh portion 72 is pivotably coupled to the seat portion 74 and may be pivoted about an axis 80 to adjust the attitude of the thigh portion 72 relative to the seat portion 74 by a drive 82, shown kinematically in FIGS. 17-19.

Figure 17:
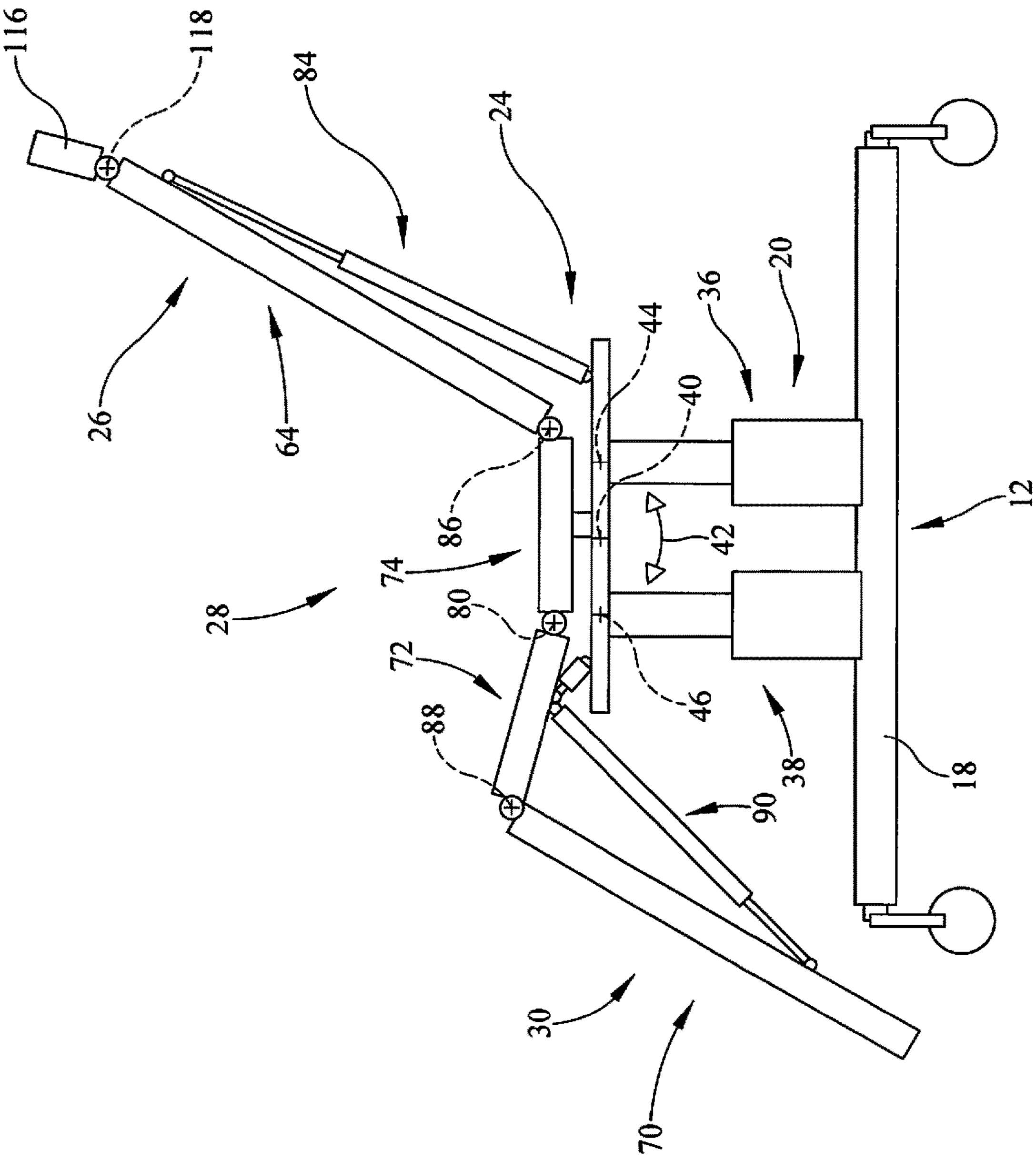
FIG. 17 is a diagrammatic view of the kinematic structure of the patient support apparatus of FIG. 2 showing the interaction of movable components of the upper frame of the patient support apparatus while the patient support apparatus is in a chair configuration.
Figure 18:
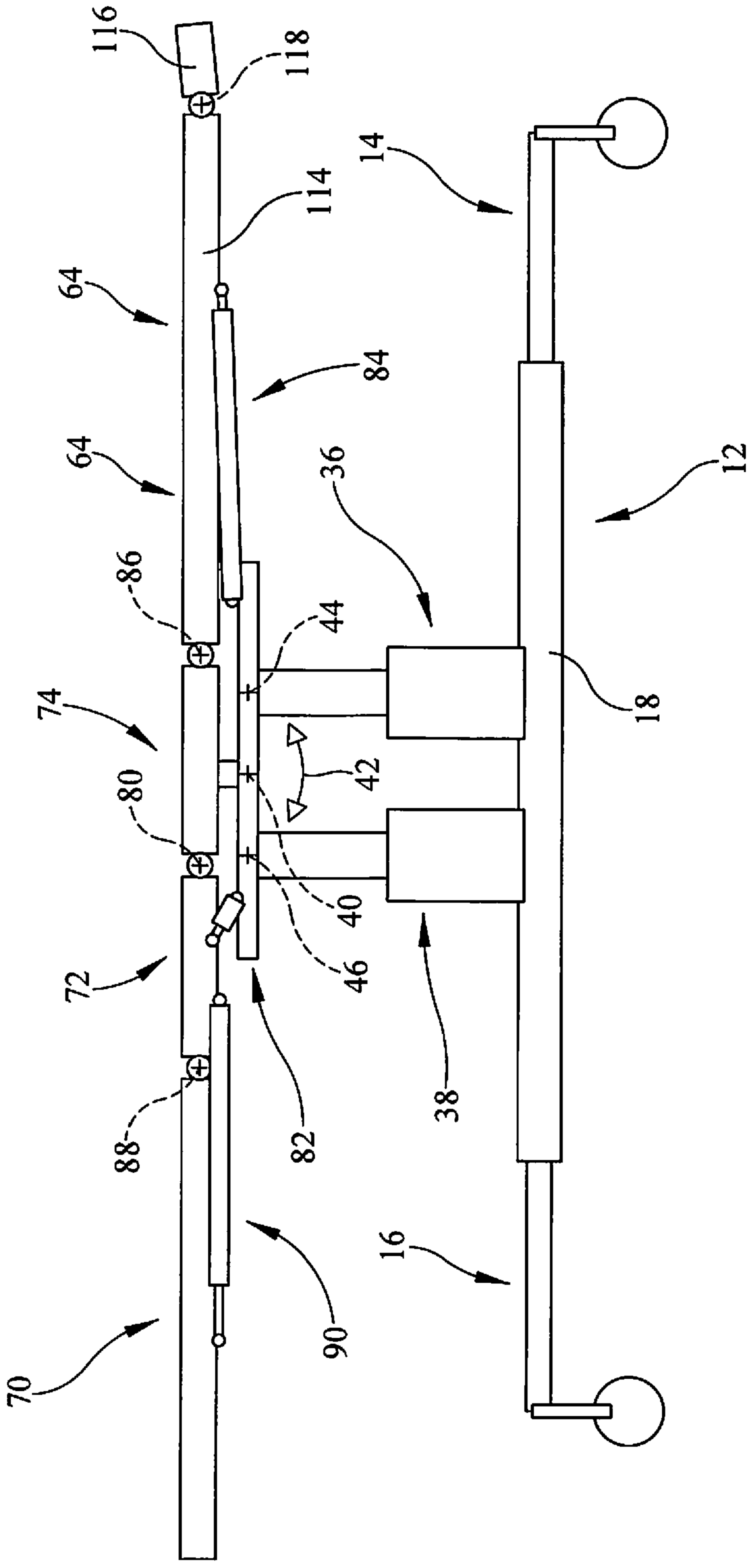
FIG. 18 is a diagrammatic view similar to FIG. 17, FIG. 18 showing the patient support apparatus in a bed configuration.

The head end arm 64 is also pivotably about an axis 86 and adjustable relative to the seat portion 74 as shown in FIG. 17 with a drive 84. The foot end arm 70 is pivotably coupled to the thigh portion 72 and pivotable about an axis 88 under the power of a drive 90. Using the drives 82, 84, 90, the upper frame 24 elements head end arm 64, foot end arm 70, thigh portion 72 and seat portion 74 may be adjusted between the chair configuration of FIG. 2 and the bed configuration shown in FIG. 1.

Referring again to FIG. 11, each of the head end arm 64, the foot end arm 70, the thigh portion 72 and the seat portion 74 have a width that is narrower than the width of a mattress 92 supported on the upper frame 24. The narrow width of the head end arm 64, the foot end arm 70, the thigh portion 72 and the seat portion 74 reduces the weight of the respective elements and improves the clearance under the mattress 92. The foot end arm 70 includes a pair of lateral beams 94 and 96 that extend from a main portion 98 to underlie the mattress 92. The mattress 92 is secured to the beams 94 and 96 by a fastening system that permits the mattress 92 to be removably secured to the beams 94 and 96, as well as the main portion 98 so that the mattress 92 may be fixed to the upper frame 24, while still being easily removed. In one embodiment, the mattress 92 includes substrates (not shown) that provide some mechanical support where there is no underlying portion of the upper frame 24 and are secured to the components of the upper frame 24 by straps that include hook and loop fasteners.

Similarly to the foot end arm 70, the thigh portion 72 includes a main portion 102 and a pair of beams 104 and 106 that extend laterally from the main portion 102. The seat portion 74 also includes a main portion 108 and a pair of laterally extending beams 110 and 112. The head end arm 64 includes a main portion 114, a head support 116 that is coupled to the main portion 114 with the head support 116 positioned at an angle relative to the main portion 114 to deflect the head end 120 of the mattress 92 to provide support for a patient's head, regardless of the position of the head end arm 64. In some embodiments, the head support 116 is adjustable relative to the main portion 114 about an axis 118 to change the angle between the two so that the elevation of the patient's head may be adjusted. The head end arm 64 also includes two beams 122 and 124 that extend from the main portion 114 to the patient's right side and two beams 126 and 126 that extend toward the patient's right side from the main portion 114. The beams 122, 124, 126, and 128 also allow the mattress 92 to be secured to the head end arm 64 while providing reduced weight and clearance under the mattress 92.

Figure 9:
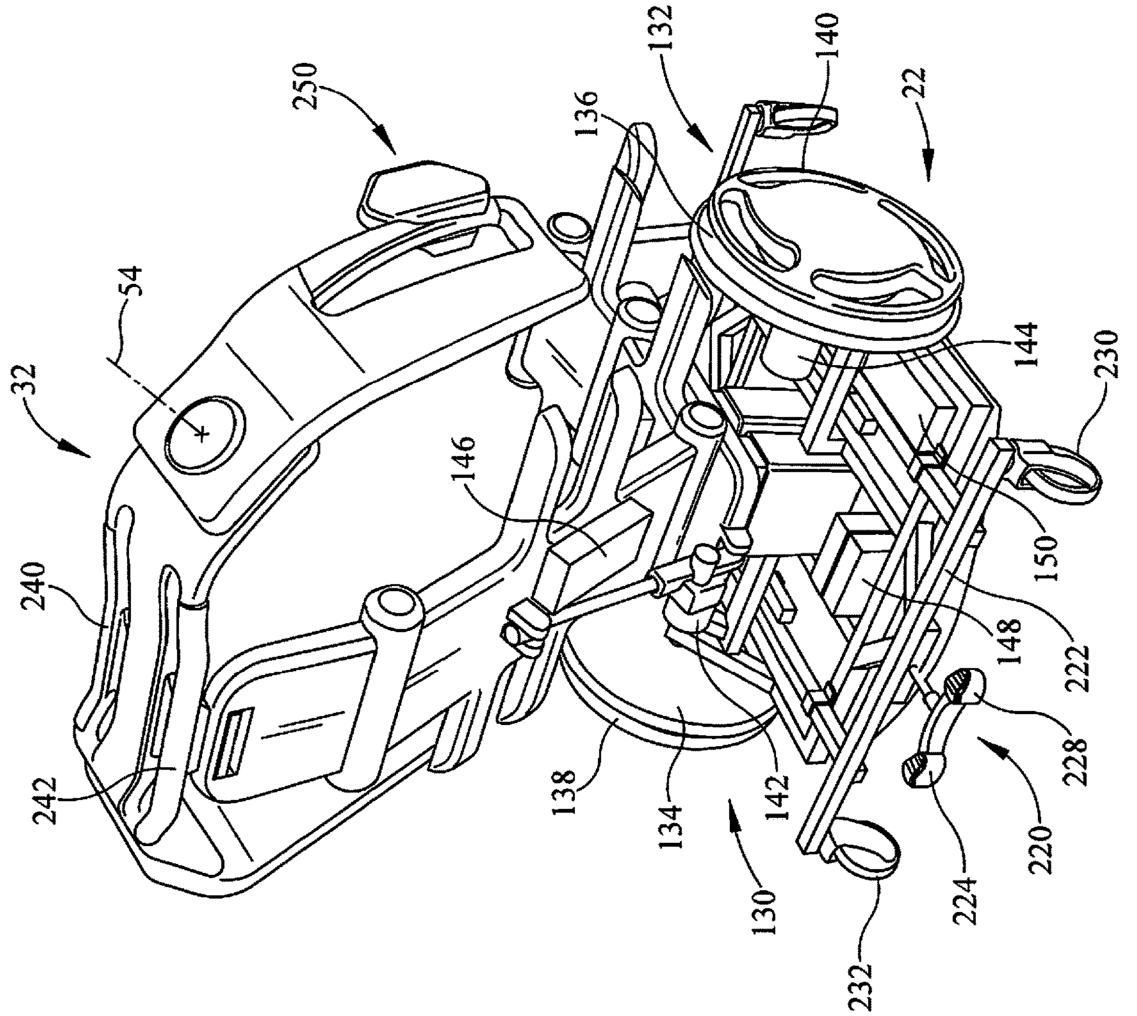
FIG. 9 is a perspective view of the patient support apparatus of FIG. 5 with portions removed to show the frame structure and the componentry of the base including drive motors, the patient support apparatus being viewed from behind the patient's right.

Referring now to FIG. 9, the drive system 22 of the patient support apparatus 10 will be explained in further detail. The drive system 22 includes a left drive unit 130 and a right drive unit 132. Each drive unit 130, 132 includes a respective drive wheel 134, 136 and a respective user input 138, 140. The user inputs 138, 140 are accessible by a patient seated on the patient support apparatus 10 when the patient support apparatus 10 is in the chair configuration. The user inputs 138, 140 allow the user to provide an input to propel the patient support apparatus 10 over the floor, similar to the functionality of a wheelchair. In some embodiments, the drive system 22 relies entirely upon the force applied by a user to the user inputs 138 and 140 which is transferred to the drive wheels 134, 136 to move the patient support apparatus 10.

Figure 14:
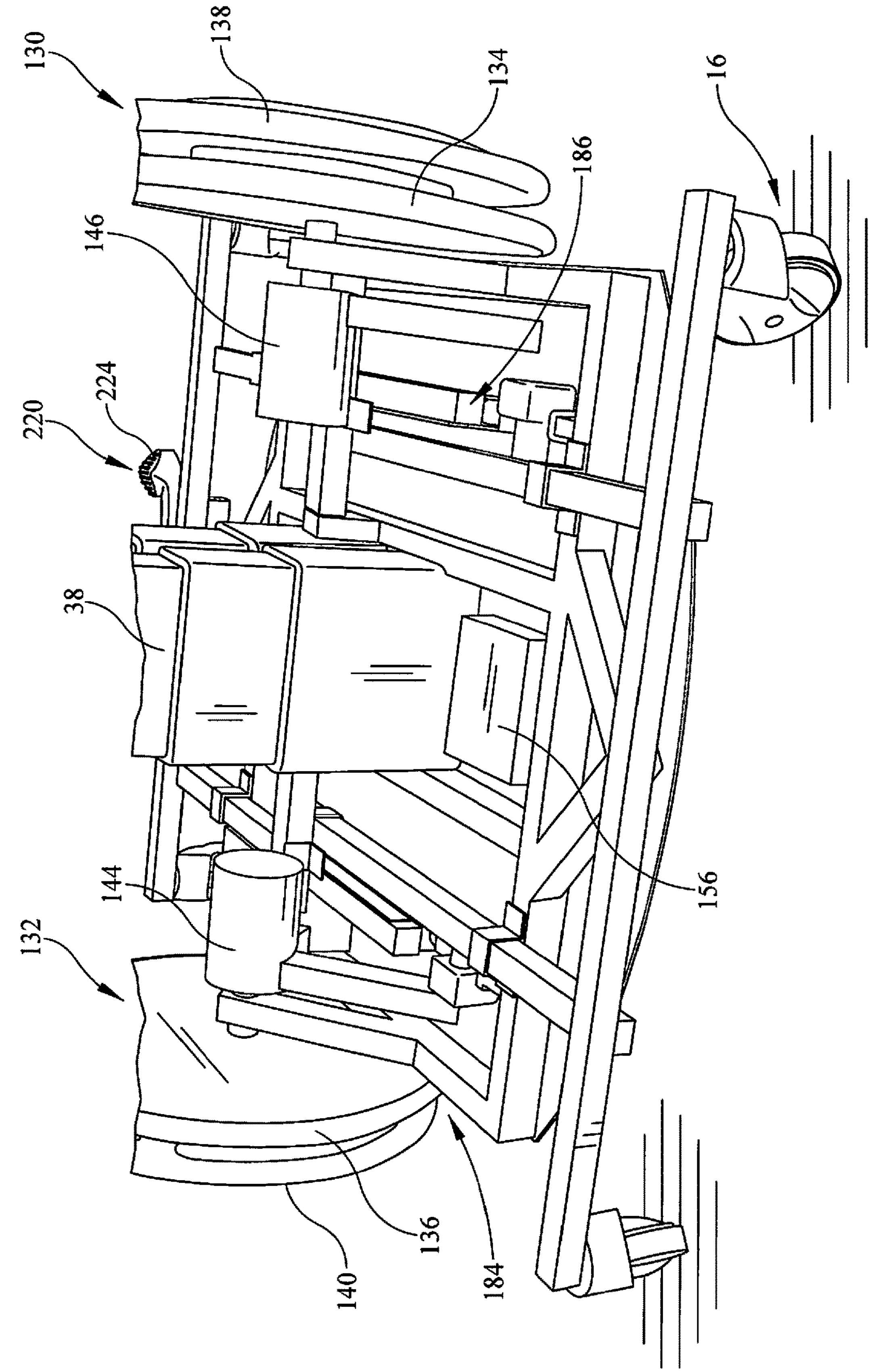
FIG. 14 is another perspective view of the base of the patient support apparatus of FIG. 11 with the portions removed to show additional details relative to the base and the drive system.
Figure 15:
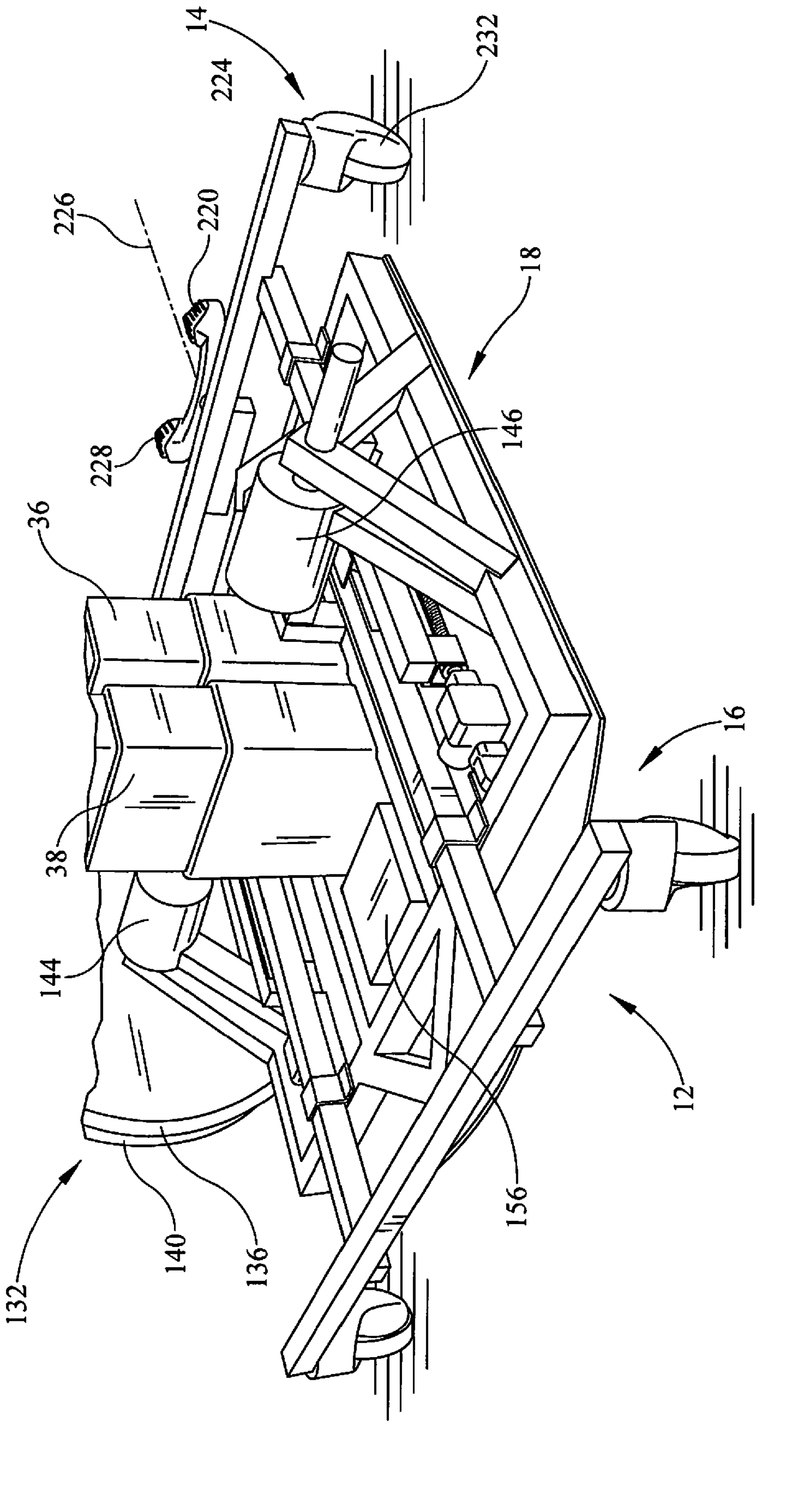
FIG. 15 is a view similar to FIG. 12 with the extension's retracted and showing additional details.
Figure 16:
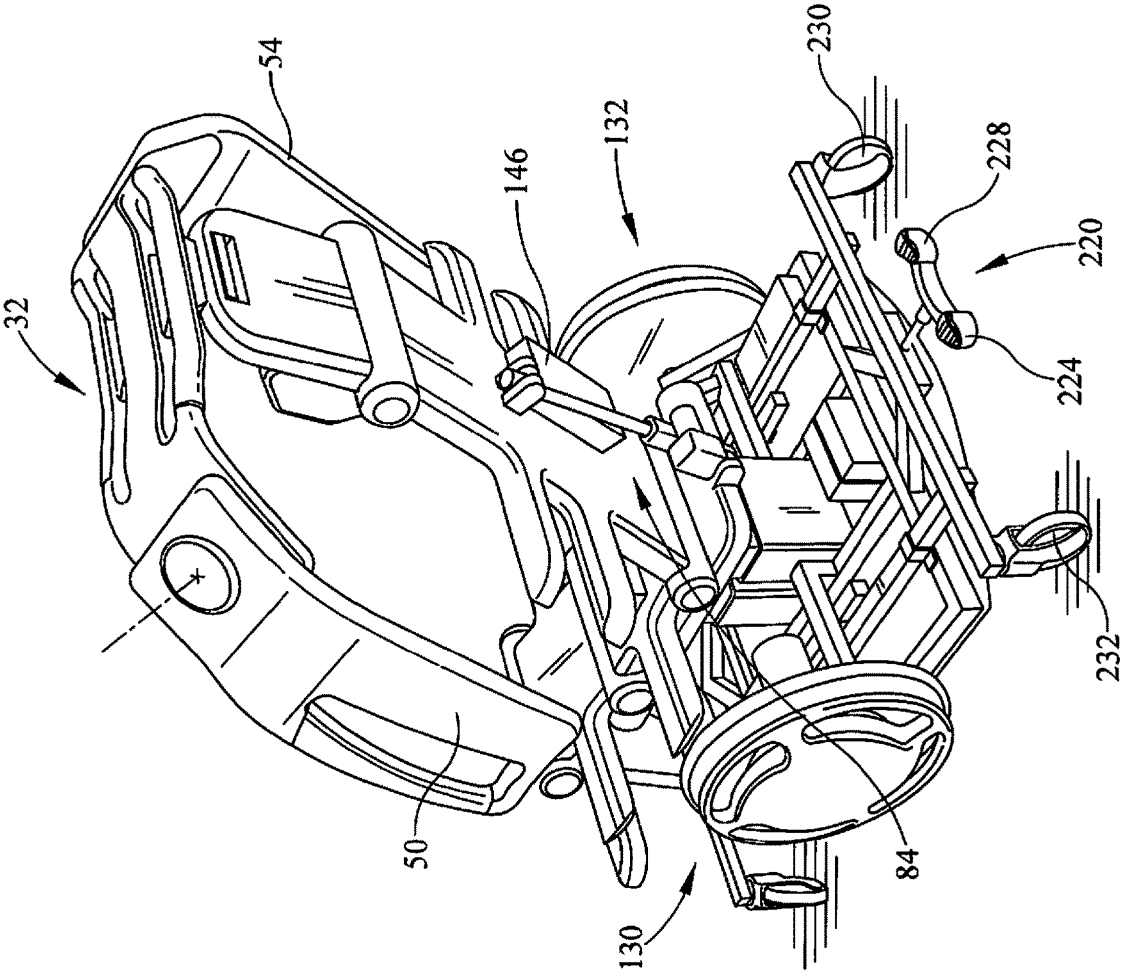
FIG. 16 is a perspective view of the patient support apparatus of FIG. 5 with portions removed to show the frame structure and the componentry of the base including drive motors, the patient support apparatus being viewed from behind the patient's left.

Referring to FIGS. 9 and 14, the drive system 22 includes respective left drive motor 142 and right drive motor 144 which react to the user inputs 138 and 140 to provide a drive signal to the respective drive motors 142 and 144 which then, in turn, drive the drive wheels 134 and 136. The action of the drive motors 142 and 144 is responsive to the magnitude of the inputs to the user inputs 138 and 140, but tend to multiply the force applied by the user so that the force input required by the user is reduced. This allows a user who is not strong enough to actually propel themselves across the floor to be independent. In addition, the magnification of the user inputs 138 and 140 can be set to offset the weight of the patient support apparatus 10 that exceeds the weight of a typical wheelchair, overcoming the difficulties of having a stretcher/bed act as a wheelchair, while still allowing a user to control the motion of the patient support apparatus 10 as a typical wheelchair.

Referring to FIG. 19, the drive system 22 is controlled by a drive controller 156 which processes the user inputs 138 and 140 and provides appropriate drive signals to the motors 142 and 144 respectively. The motors 142 and 144, as well as the drive controller 156, all receive power from a battery module 148. The battery module 148 is charged by a power supply 150, which is plugged into mains power 454 by a cord 444 when the patient support apparatus 10 is positioned in fixed location. When the patient support apparatus 10 is going to be moved, the cord 444 is disconnected from the mains power 454 and the patient support apparatus 10 is operated by the battery module 148. When the cord 444 is connected to mains power 454, the motors 142 and 144, as well as the drives 82, 84, and 90, are all powered through the mains power 454. When the cord is disconnected, the battery module 148 is used to power the motors 142, 144 and drives 82, 84, and 90 as well as all of the control circuitry of the patient support apparatus 10.

Figure 12:
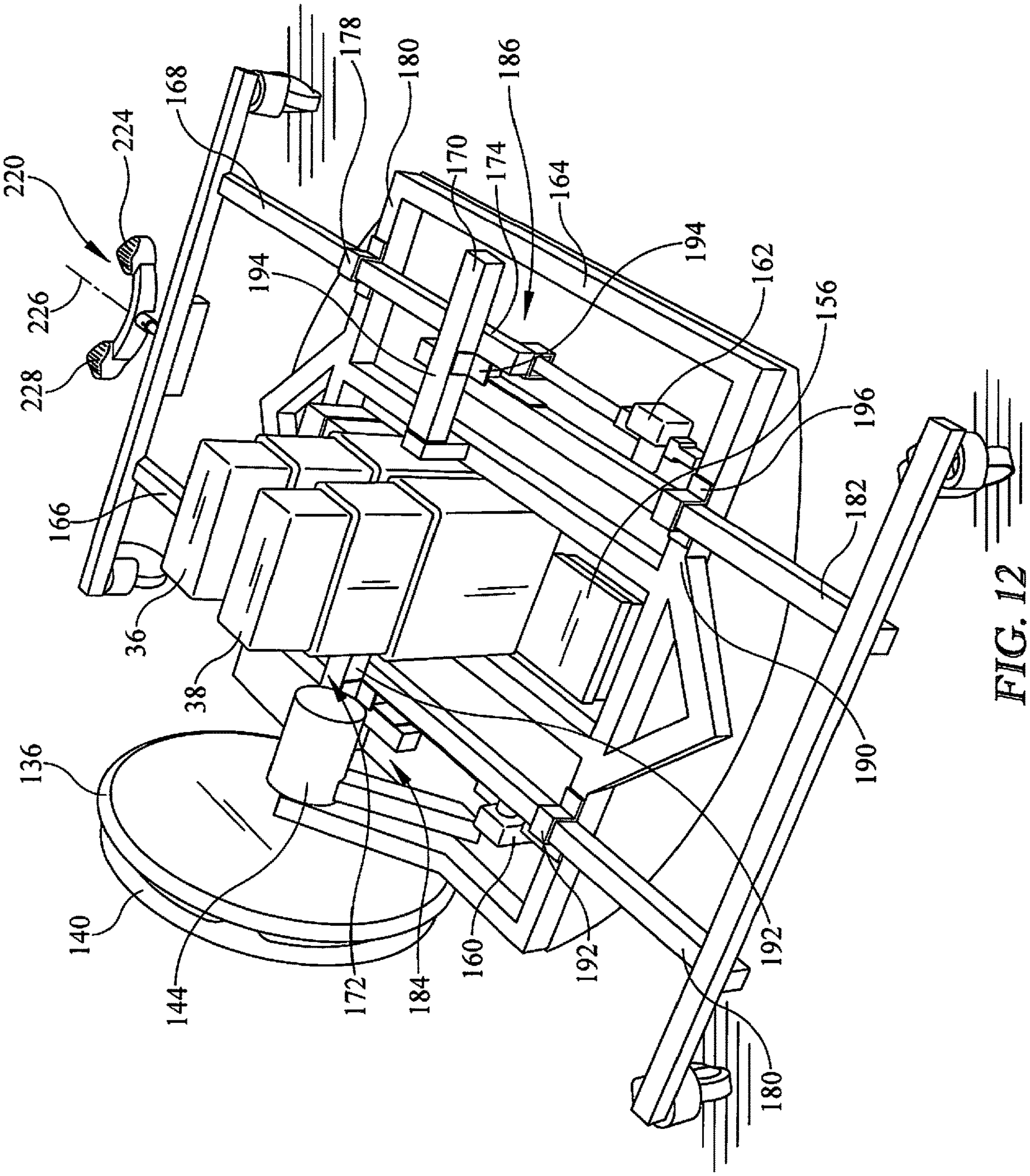
FIG. 12 is a perspective view of the base of the patient support apparatus of FIG. 11 with portions removed, the base of the patient support apparatus of FIG. 12 having a pair of extensions extended to lengthen the base to improve stability for the bed configuration.
Figure 13:
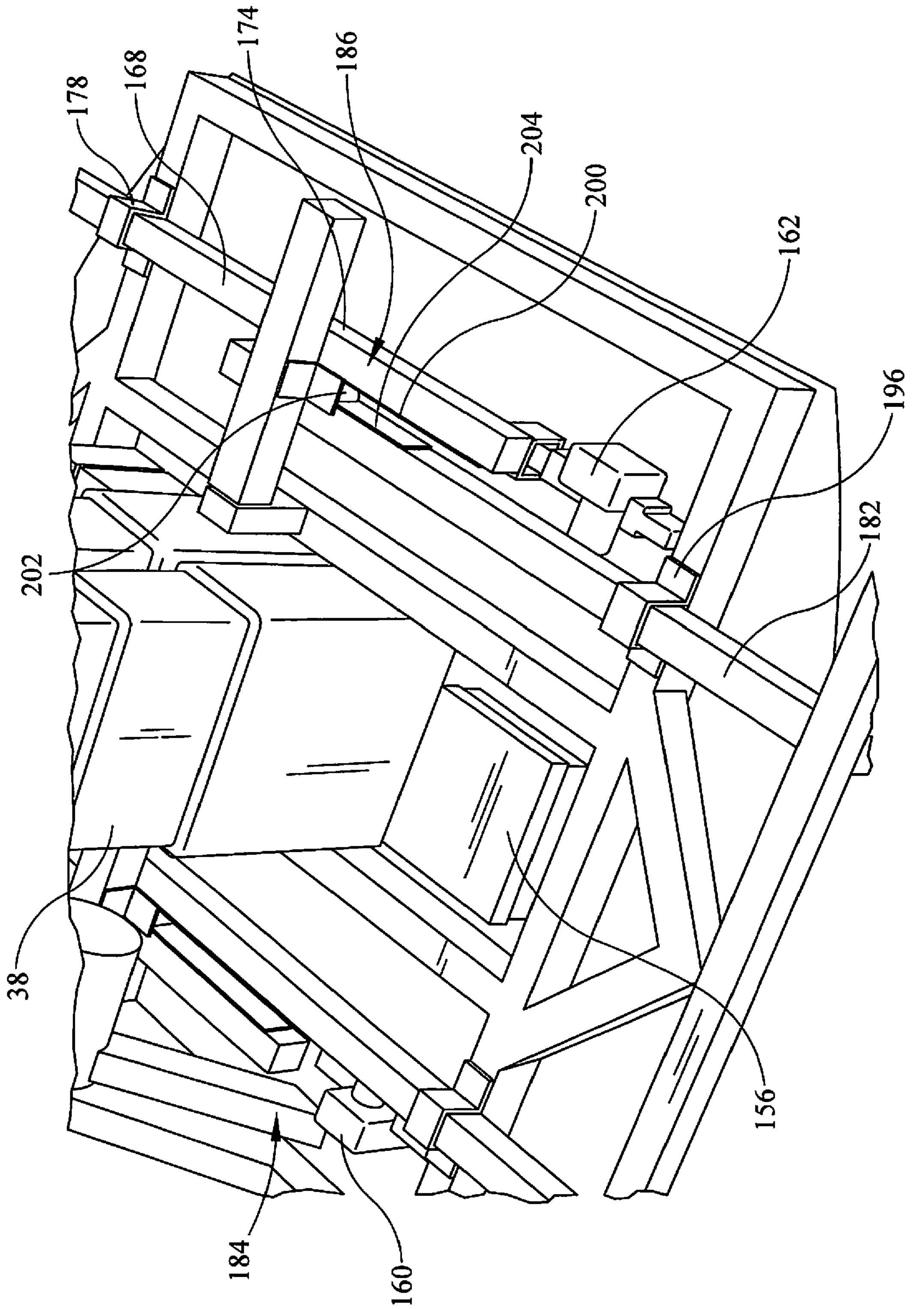
FIG. 13 is an enlarged view of a portion of the base of FIG. 12.

Referring now to FIGS. 12-14, the operation of the extendable base 12 includes the coordinated extension of the extensions 14 and 16 relative to the main portion 18 of the base 12. The movement of the extensions 14 and 16 is caused by the coordinated extension and retraction of two drives 160 and 162. Each of the drives 160 and 162 are fixed at one end to a frame 164 of the base 12. The opposite ends of the drives 160 and 162 are connected to respective beams 166 and 168 of the extension 14. The beams 166 and 168 are supported from a cross-bar 170 which includes respective yokes 172 and 174 which engage the beams 166 and 168 but permit relative movement of the beams 166 and 168 relative to the cross-bar 170. The cross-bar 170 is a component of the frame 164 so that the movement of the beams 166 and 168 is relative to the frame 164.

The beams 166 and 168 are also engaged with another set of respective yokes 176 and 178 which are supported from a member 180 of the frame 164. The yokes 172 and 176 cooperate to guide the movement of the beam 166 relative to frame 164, while the yokes 174 and 178 cooperate to guide the movement of beam 168 relative to frame 164. Thus, as the drives 160 and 162 extend, the extension 14 is extended relative to main portion 18 of the base 12 and as the drives 160 and 162 retract, the extension 14 is retracted relative to the main portion 18.

Movement of the beams 166 and 168 drives 160 and 162 is also transferred to two beams 180 and 182 of the extension 16 through a pair of transmissions 184 and 186. The beam 180 is supported on the cross-bar 170 by a yoke 188 and on a member 190 of frame 164 by a yoke 192. Similarly, the beam 182 is supported on the cross-bar 170 by a yoke 194 and the member 190 by a yoke 196. Thus, the movement of the beams 180 and 182 relative to the respective yokes 188, 192 and 194, 196 results in movement of the extension 16 relative to the frame 164 and main portion 18 of the base 12. The transmissions 184 and 186 cooperate to cause the movement of the extension 16 to be coordinated with and proportional to the movement of the extension 14. Each transmission comprises a drive rack 200, a follower rack 202, and a pinion 204. The drive rack 200 of each transmission 184 and 186 is positioned on the driven beams 166 and 168 of extension 14. The follower rack 202 of each transmission 184 and 186 is positioned on the beams 180 and 182 of the extension 16. The pinion 204 of each transmission 184 and 186 is positioned between the respective drive rack 200 and follower rack 202 and supported by the cross-bar 170. The pinion 204 is rotatable relative to the cross-bar 170 so that as the drive rack 200 is moved, teeth 210 of the drive rack 200 engages teeth 212 of the pinion 204 to cause the pinion 204 to rotate. The teeth 212 of the pinion 204 engage teeth 214 of the follower rack 202 such that the motion of the drive rack 200 is transferred through the pinion 204 to the follower rack 202, causing movement of the beams 180 and 182.

In use, the drives 160 and 162 are controlled by a controller 146 (shown in FIG. 9) which also controls the drives 82, 84, and 90 and the lifts 36 and 38. The length of the base 12 is controlled by the position of the extensions 14 and 16, but is dependent on the configuration of the upper frame 24 of the patient support apparatus 10. In use, the extensions 14 and 16 are positioned to reduce the potential of tipping of the patient support apparatus 10 due to a cantilevered load being positioned to far from the center-of-gravity of the patient support apparatus 10. As the head section 26 and foot section 30 of the patient support apparatus 10 are moved to the chair configuration, the potential for a tipping issue to arise is reduced. As such, the extensions 14 and 16 are controlled based on the position of the head section 26 and foot section 30. The controller 146 receives inputs to control the position of the head section 26 and foot section 30 and processes the positions of those components to move the extensions 14 and 16. Thus, in operation, the control of the position of the extensions 14 and 16 is controlled by logic on the controller 146, which, in turn, controls the operation of the drives 160 and 162. Each of the drives 160, 162, 82, 84, and 90 and the lifts 36 and 38 have internal sensors (not shown) that provide position information so that the controller 146 is able to discern the position of all of the components of the patient support apparatus 10 at any time and control the extensions 14 and 16 to mitigate the potential for tipping of the patient support apparatus 10 and to provide clearance for other components as necessary.

In some embodiments, the patient support apparatus 10 also includes an input pedal 220 (seen in FIG. 12, for example) that is actuable by a user to choose a mobility mode of the patient support apparatus 10. When present, the pedal 220 is supported on a cross-bar 222 of the extension 14 and is movable to three positions which correspond to three modes: neutral, as shown in FIG. 12; brake, which is achieved when a user steps on a pad 224 to cause the pedal 220 to rotate about its axis 226 to position pad 224 lower than a pad 228, and steer, which is achieved when user steps on the pad 228 and causes the pedal 220 to move to the pad 228 a to a position that is lower than the pad 224. In the brake mode, the pedal 220 actuates a mechanical braking system to lock two casters 230 and 232 positioned on the extension 14 to prevent them from rotating about a horizontal axis and swiveling about a vertical axis, as is known in the art. In the brake mode, a signal is sent to the drive controller 156 to cause the drive wheels 134 and 136 to be immobilized electrically to create two additional points to block the patient support apparatus 10 from movement relative to the floor. In the neutral position, the casters 230 and 232 and the drive wheels 134 and 136 are all free to move independently to allow the patient support apparatus 10 to be moved in a free wheel mode over the floor. In the steer mode, the casters 230 and 232 are placed in the neutral mode so that they are free to rotate and swivel, but the drive wheels 134 and 136 are placed under control of the drive controller 156 and driven by the motors 142 and 144 respectively. The patient support apparatus 10 includes a sensor assembly (not shown) which is operable to detect the position of the pedal 220 and provide that information to the drive controller 156. However, in some embodiments, the mechanical structure that changes the mode of the casters 230 and 232 is omitted and casters 230 and 232 remain free to rotate and swivel in all modes. When the casters 230 and 232 remain free to rotate and swivel, the locking of the patient support apparatus 10 relative to the floor is effected by the drive wheels 134 and 136 only.

In one embodiment, the user inputs 138 and 140 move with the drive wheels 134 and 136 respectively, but are connected to the drive wheels 134 and 136 by load sensors (not shown) which sense torque applied to the user inputs 138 and 140 and the drive controller 156 responds to those inputs to mimic the operation of a wheelchair. In another embodiment, the user inputs 138 and 140 may be fixed relative to the drive wheels 134 and 136 so that a user must apply a constant force to the user inputs 138 and 140 to provide a drive signal for the respective drive wheel 134 or 136. In this way, the user does not have to move their hands, but only applies a relative force to provide a relative input to the respective drive wheel 134 or 136, much like a zero-turn lawn mower or a skid steer apparatus.

In addition to the user inputs 138 and 140, which are configured to allow a patient to provide an input to the drive wheels 134 and 136, the patient support apparatus 10 also includes a caregiver responsive input 260 positioned in the head support 116. The caregiver input 260 is embodied as a strain gauge that is responsive to pressure applied to the head end panel 48 at either an upper grip 240 or lower grip 242 shown in the embodiment of FIG. 9. Pressure on either of the grips 240 or 242 is sensed by the strain gauge 260 and is translated to a drive signal by the drive controller 156. The strain gauge 260 is configured to measure torque applied to the grips 240 or 242 to determine the relative drive speed of each of the drive wheels 134 and 136 to steer the patient support apparatus 10 from the input by the caregiver on the grip 240 or 242. The grips 240 and 242 are used when the patient support apparatus 10 is being used to transport the patient in a bed configuration, or when a caregiver has control over the patient support apparatus 10. The strain gauge 260 signal is provided by the caregiver applying pressure to the grip 240 or grip 242 overrides any input applied to the user inputs 138 or 140 as the caregiver control dominates the patient control of the patient support apparatus 10.

Figure 8:
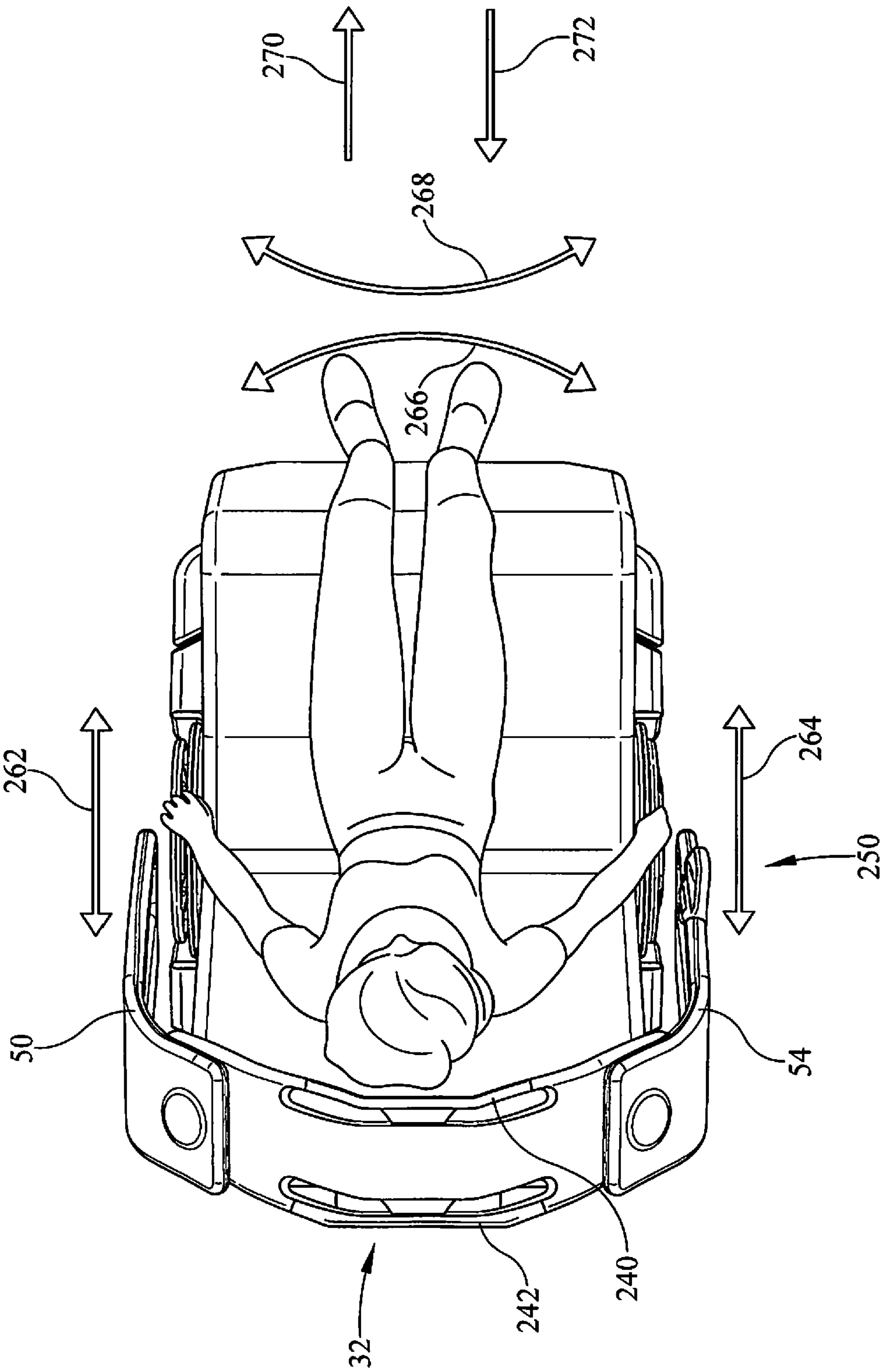
FIG. 8 is a top perspective view of the patient support apparatus of FIG. 7.

As suggested in FIG. 8, a user may apply force in either a forward or rearward direction on the left side of the patient support apparatus 10 as indicated by arrow 262. Similarly, the user may apply force in the forward or rearward direction on the left side of the patient support apparatus 10 as indicated by arrow 264. The various resulting motions of the patient support apparatus 10 are suggested by the arrows 266, 268, 270, and 272. The patient support apparatus 10 may make a reverse turn as suggested by arrow 266, a forward turn as suggest by arrow 268, or may move forward as indicated by arrow 270 or in reverse as indicated by arrow 272.

In some embodiments, the patient support apparatus 10 further includes a wireless pendant 250 which has user inputs typical of a patient support apparatus 10 that allows a user to provide inputs to the controller 146 wirelessly. As shown diagrammatically in FIG. 25, in the illustrative embodiment, the pendant 250 communicates to the controller 146 using Bluetooth® based protocol, but other wireless protocols may be employed as well. In still other embodiments, the pendant 250 may be connected to the controller 146 by a wired connection. The pendant 250 may be inductively charged when it is mounted to another component of the patient support apparatus 10. The pendant 250 includes a touchscreen graphical user interface (GUI) and any functions that are limited to an authorized caregiver are not displayed on the GUI until an authorized user is detected to be in the vicinity of the GUI by a locating and tracking system or by a wireless RFID signal from a caregiver identification tag or system. The pendant 250 is paired with a particular patient support apparatus 10 and if the pendant 250 is taken out of range of the patient support apparatus 10, the GUI will provide a message to return the pendant to the appropriate patient support apparatus 10.

Figure 20:
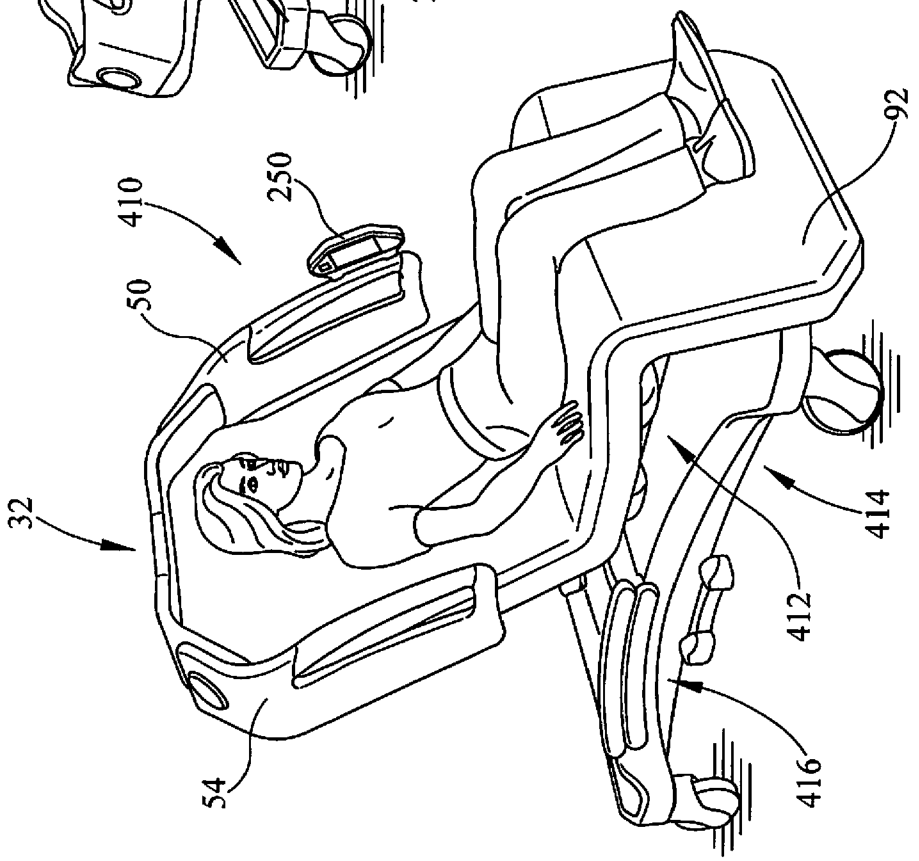
FIG. 20 is a perspective view of another embodiment of patient support apparatus according to the present disclosure, the patient support apparatus of FIG. 20 having a different lift system and lacking a drive system present on the embodiments of FIGS. 1-19, the patient support apparatus of FIG. 20 shown in a chair configuration.

Another embodiment of a patient support apparatus 410 is shown in FIGS. 20-21 has an upper frame 412 that functions similarly to the upper frame 24 discussed above. The patient support apparatus 410 utilizes a base 414 that does not have any extensions or any ability to extend and retract. The patient support apparatus 410 also utilizes a cantilevered lift system 416 that is similar to the lift system of the Century CC® bed previously available from Hill-Rom Services, Inc. of Batesville, Indiana. The patient support apparatus 410 utilizes a typical brake-steer system, such as that available in the CareAssist® ES bed discussed above.

Figure 22:
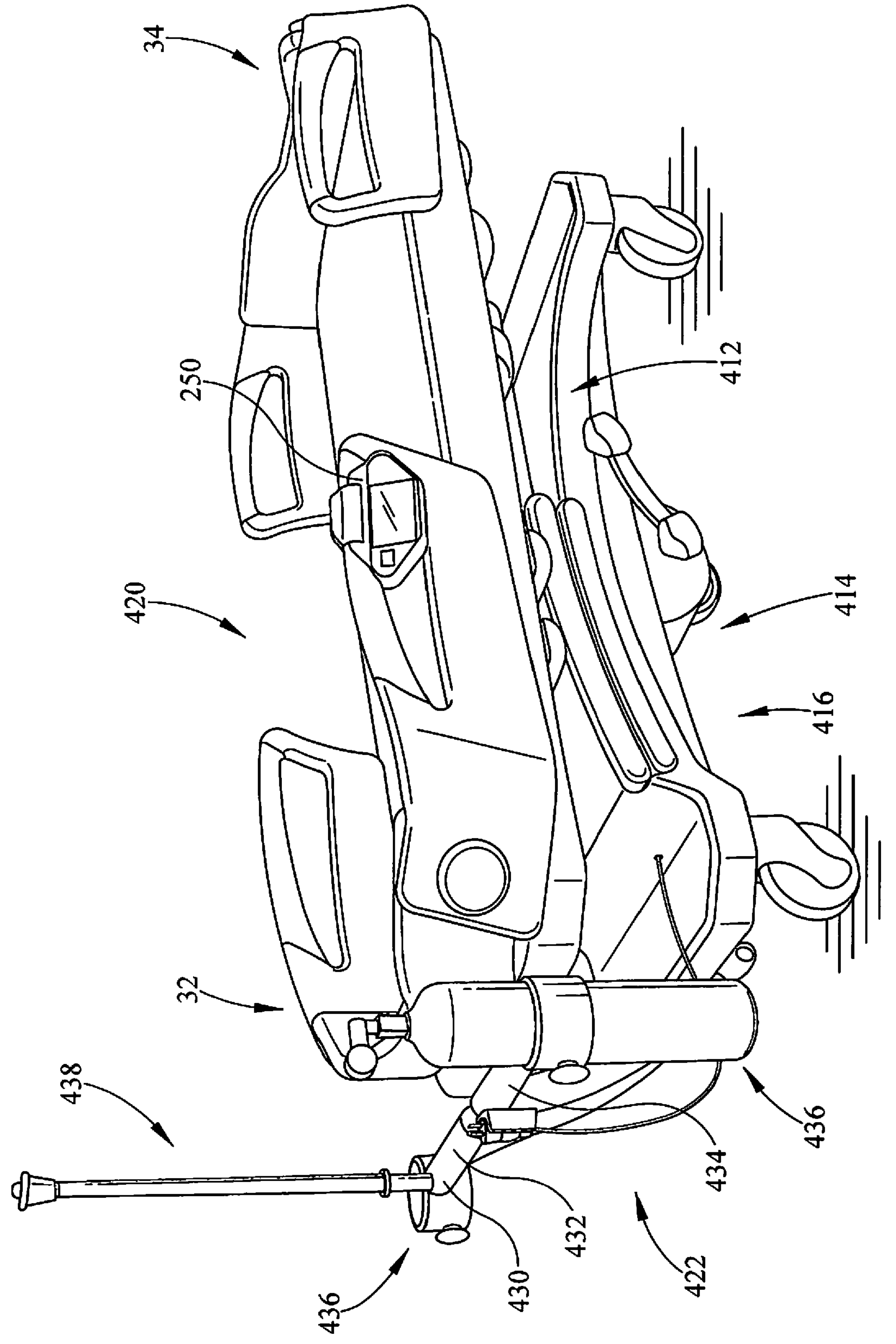
FIG. 22 is a perspective view of the patient support apparatus of FIGS. 20-21 with an alternate head end structure that includes an alternate push handle input and accessory support structure.
Figure 23:
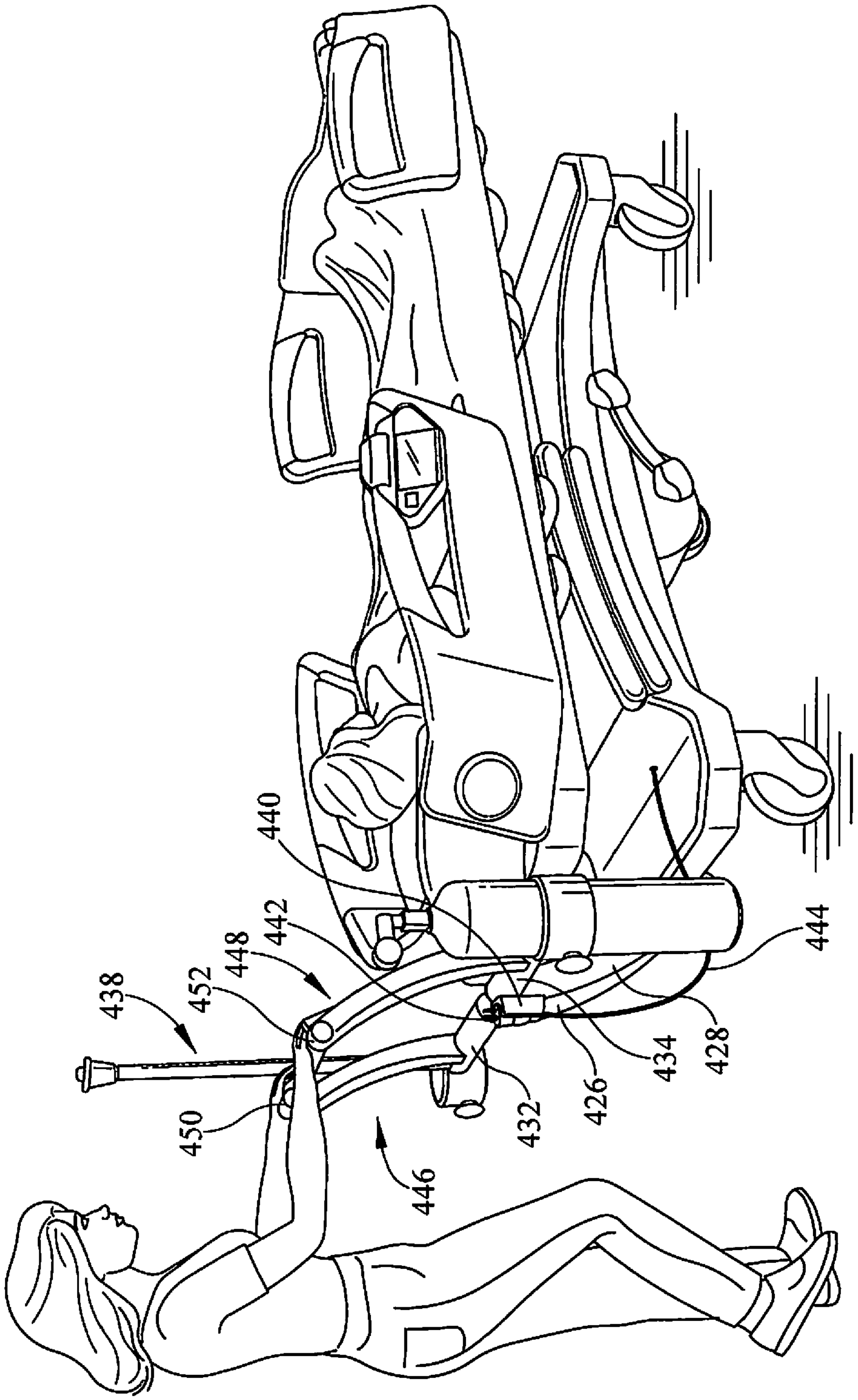
FIG. 23 is another view of the embodiment of FIG. 22.
Figure 24:
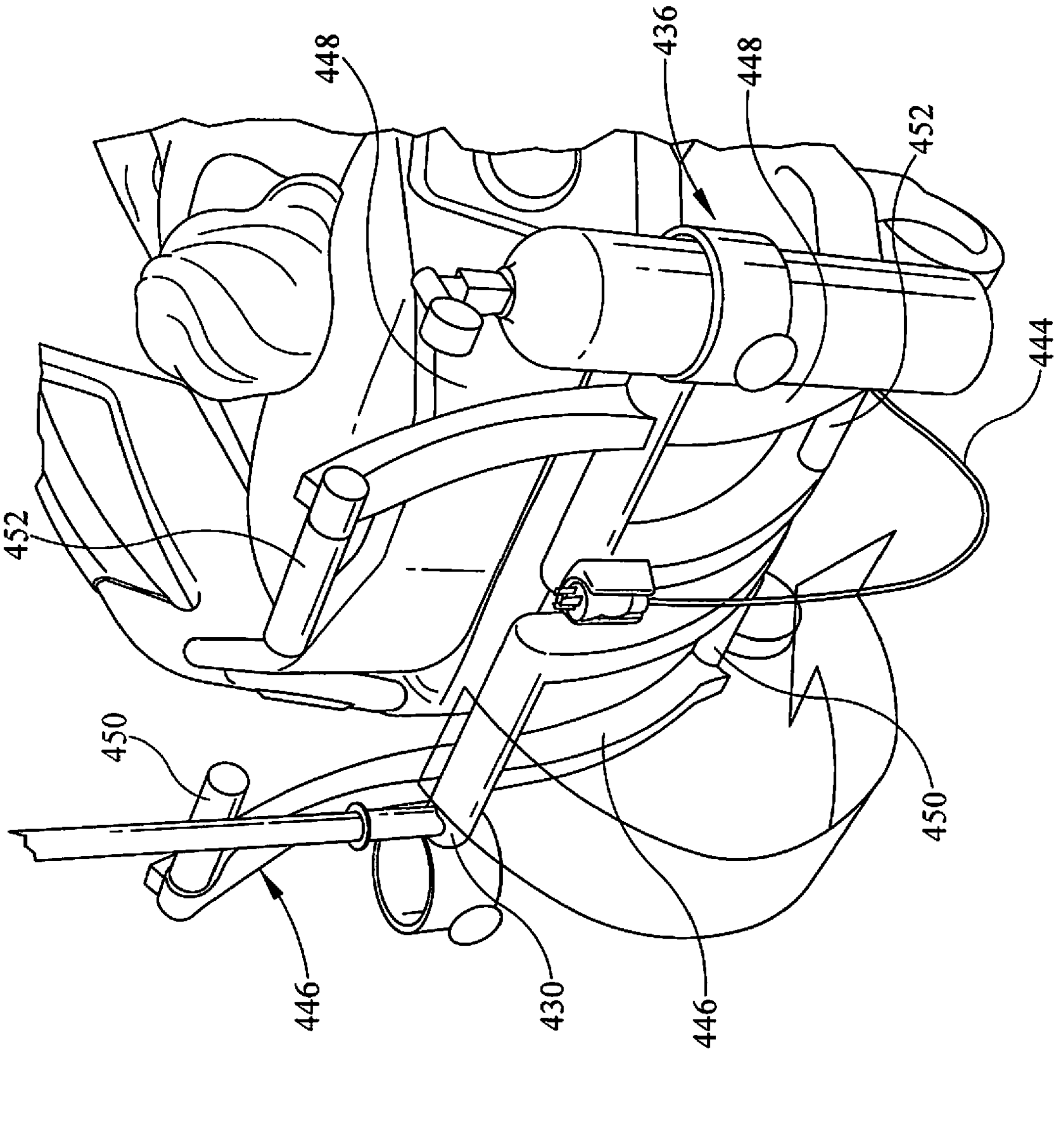
FIG. 24 is illustrates the ability of the push handles of the embodiment of FIGS. 22-23 to be stowed to an out of the way position.

Referring to FIG. 22, an embodiment of patient support apparatus 420 is similar to the patient support apparatus 410, but includes a head end structure 422 that provides support for accessories as well as a stowable push handle assembly 424. The structure 422 includes two posts 426 and 428 that extend upwardly from the base 414 of the patient support apparatus 420. The posts 426 and 428 have respective arms 432, 434 that extend outboard from each of the posts 426 and 428. The arms 432 and 434 each support an oxygen tank holder 436 with the arm 432 formed to include a receiver 430 for receiving an IV pole 438. The arm 434 supports a receiver 440 for securing a plug 442 of a power cord 444. A set of respective push handles 446 and 448 are supported from the arms 432 and 434 and are positioned to be used by a caregiver to push the patient support apparatus 420 over a floor. The push handles 446 and 448 are adjustable relative to the arms 432 and 434 to change the height of grips 450 and 452, respectively. The push handles 446 and 448 are engaged with the arms 432 and 434 with a ratcheting mechanism (not shown) that allows the push handles 446 and 448 to be released from the arms 432 and 434 to rotate about the arms 432 and 434 to a number of different positions. The release for each of the push handles 446 and 448 are positioned in the grips 450 and 452.

Figure 25:
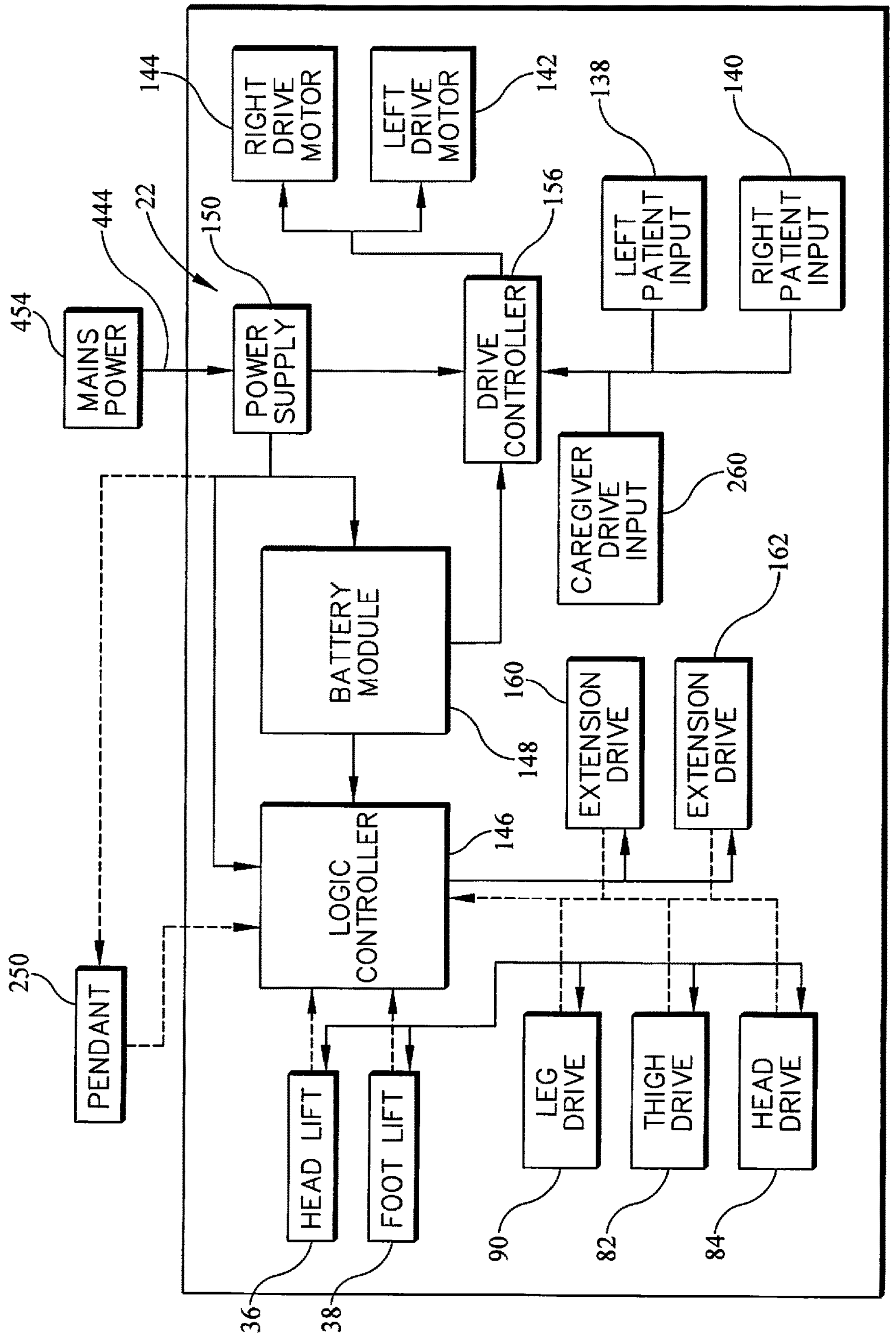
FIG. 25 is block diagram of the patient support apparatus of FIGS. 1-19.

Referring now to FIG. 25, a diagrammatic representation of the control system of the patient support apparatus 10 is disclosed. The lifts 36 and 38 and drives 82, 84, 90, 160, and 162 are controlled by the controller 146 as indicated by the solid arrows. The lifts 36 and 38 and drives 82, 84, 90, 160, and 162 include sensor that are used to determine the position of each and provide that information back to the controller 146 as suggested by the dotted lines. The drive controller 156 receives inputs from either the caregiver input 260 or the left patient input 138 and right patient input 140. This information is used to control the operation of the left drive motor 142 and right drive motor 144. The controller 146 and the motor controller 156 each include a processor and a memory device that stores the instructions that are processed by the processor to effect the control of the various s motors, lifts, and drives. It should be understood that the controller 146 and motor controller 156 may be networked together to share certain data relative to the overall control of the patient support apparatus 10. The pendant 250 provides input signals to the controller 146 via the wireless connection as suggested by the dotted lines connecting the two. Similarly, in some embodiments, the pendant 250 receives inductive charging from the power supply 150.

Although this disclosure refers to specific embodiments, it will be understood by those skilled in the art that various changes in form and detail may be made without departing from the subject matter set forth in the accompanying claims.

The invention claimed is:

1. A patient support apparatus comprising a frame including a receiver formed in the frame, the receiver having a spring-loaded grip actuated by a handle positioned on the receiver, and a removable barrier assembly having a fixed panel, the removable barrier assembly including a tab, the tab extending from the fixed panel, the tab being configured to be received in the receiver formed in the frame, the tab having a channel formed in a surface of the tab, the channel engageable by the spring-loaded grip when the tab is positioned in the receiver, wherein when the spring-loaded grip engages the channel the spring-loaded grip and channel cooperate to retain the tab in the receiver, wherein the handle is actuatable between a locked position where the spring-loaded grip engages the channel to secure the tab from removal from the receiver, and a release position wherein the spring-loaded grip disengages the channel which allows the tab to be removed from the receiver.

2. The patient support apparatus of claim 1, wherein the receiver is pivotably coupled to a main portion of the frame and adjustable relative to the main portion about a pivot axis.

3. The patient support apparatus of claim 2, wherein the removable barrier assembly moves with the receiver as the receiver is adjusted relative to the main portion.

4. The patient support apparatus of claim 3, wherein the removable barrier assembly comprises a first movable panel pivotably coupled to the fixed panel and movable relative to the fixed panel between a barrier position wherein the first movable panel is positioned along a first lateral side of the patient support apparatus and an out of the way position wherein the first movable panel is positioned in a nested position with the fixed panel.

5. The patient support apparatus of claim 4, wherein the removable barrier assembly further comprises a second movable panel pivotably coupled to the fixed panel on a side opposite the first movable panel, the second movable panel movable between a barrier positon wherein the second movable panel is positioned along a second lateral side of the patient support apparatus and an out of the way position wherein the second movable panel is positioned in a nested position with the fixed panel.

6. The patient support apparatus of claim 5, wherein the first movable panel pivots relative to the fixed panel about a first axis.

7. The patient support apparatus of claim 6, wherein the second movable panel pivots relative to the fixed panel about a second axis.

8. The patient support apparatus of claim 6, wherein the second movable panel pivots relative to the fixed panel about a second axis that is offset relative to the first axis such that the first movable panel and second movable panel do not interfere when they are moved to their respective out of the way positions.

9. The patient support apparatus of claim 1, wherein the removable barrier assembly comprises a first movable panel pivotably coupled to the fixed panel and movable relative to the fixed panel between a barrier position wherein the first movable panel is positioned along a first lateral side of the patient support apparatus and an out of the way position wherein the first movable panel is positioned in a nested position with the fixed panel.

10. The patient support apparatus of claim 9, wherein the removable barrier assembly further comprises a second movable panel pivotably coupled to the fixed panel on a side opposite the first movable panel, the second movable panel movable between a barrier positon wherein the second movable panel is positioned along a second lateral side of the patient support apparatus and an out of the way position wherein the second movable panel is positioned in a nested position with the fixed panel.

11. The patient support apparatus of claim 10, wherein the first movable panel pivots relative to the fixed panel about a first axis.

12. The patient support apparatus of claim 11, wherein the second movable panel is pivotable relative to the fixed panel about a second.

13. A patient support apparatus comprising a frame including a main portion and a receiver formed in the frame, the receiver adjustable relative to the main portion about a pivot axis, the receiver having a spring-loaded grip actuated by a handle positioned on the receiver, and a removable barrier assembly having a fixed panel including a tab, the tab extending from the fixed panel, the tab being configured to be received in the receiver formed in the frame, the tab having a channel formed in a surface of the tab, the channel engageable by the spring-loaded grip when the tab is positioned in the receiver, wherein when the spring-loaded grip engages the channel the spring-loaded grip and channel cooperate to retain the tab in the receiver, to retain the tab in the receiver to secure the removable barrier assembly to the receiver such that the removable barrier assembly moves with the receiver as the receiver pivots about the pivot axis, the barrier assembly including an upper push grip positioned for use when the receiver is pivoted to a lowered position and a lower push grip positioned for use when the receiver pivoted to a raised position.

14. The patient support apparatus of claim 13, wherein the handle is actuatable between a locked position where the spring-loaded grip engages the channel to secure the tab from removal from the receiver, and a release position which allows the tab to be removed from the receiver.

15. The patient support apparatus of claim 13, wherein the removable barrier assembly comprises a first movable panel pivotably coupled to the fixed panel and movable relative to the fixed panel between a barrier position wherein the first movable panel is positioned along a first lateral side of the patient support apparatus and an out of the way position wherein the first movable panel is positioned in a nested position with the fixed panel.

16. The patient support apparatus of claim 15, wherein the removable barrier assembly further comprises a second movable panel pivotably coupled to the fixed panel on a side opposite the first movable panel, the second movable panel movable between a barrier positon wherein the second movable panel is positioned along a second lateral side of the patient support apparatus and an out of the way position wherein the second movable panel is positioned in a nested position with the fixed panel.

17. The patient support apparatus of claim 16, wherein the first movable panel pivots relative to the fixed panel about a first axis.

18. The patient support apparatus of claim 17, wherein the second movable panel is pivotable relative to the fixed panel about a second axis that offset relative to the first axis.

19. The patient support apparatus of claim 13, wherein the removable barrier assembly comprises a first movable panel pivotably coupled to the fixed panel and movable relative to the fixed panel about a first axis, and a second movable panel pivotably coupled to the fixed panel and movable relative to the fixed panel about a second axis that is offset relative to the first axis such that the first and second panels are movable to an out of the way position where both the first movable panel and the second movable panel are nested with, 21 the fixed panel.

20. The patient support apparatus of claim 1, wherein the removable barrier assembly comprises a first movable panel pivotably coupled to the fixed panel and movable relative to the fixed panel about a first axis, and a second movable panel pivotably coupled to the fixed panel and movable relative to the fixed panel about a second axis that is offset relative to the first axis such that the first and second panels are movable to an out of the way position where both the first movable panel and the second movable panel are nested with the fixed panel.

* * * * *